(12) United States Patent
Tanaka et al.

(10) Patent No.: US 11,361,474 B2
(45) Date of Patent: Jun. 14, 2022

(54) METHOD AND SYSTEM FOR SUBGRID CALIBRATION OF A DISPLAY DEVICE

(71) Applicant: Magic Leap, Inc., Plantation, FL (US)

(72) Inventors: Kazunori Tanaka, Irvine, CA (US);
Lei Zhang, Sunnyvale, CA (US);
Etienne Gregoire Grossmann, Menlo Park, CA (US); Marshall Charles Capps, Fort Lauderdale, FL (US);
Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/530,877

(22) Filed: Aug. 2, 2019

(65) Prior Publication Data
US 2020/0043201 A1    Feb. 6, 2020

Related U.S. Application Data

(60) Provisional application No. 62/714,502, filed on Aug. 3, 2018.

(51) Int. Cl.
*G06T 11/00* (2006.01)
*H04N 17/04* (2006.01)
(Continued)

(52) U.S. Cl.
CPC ............ *G06T 11/001* (2013.01); *G06F 3/011* (2013.01); *G06T 19/006* (2013.01);
(Continued)

(58) Field of Classification Search
CPC ..... G06T 11/001; G06T 19/006; H04N 17/04; H04N 9/69; H04N 9/67; G09G 5/026;
(Continued)

(56) References Cited

U.S. PATENT DOCUMENTS

| 6,225,974 B1 * | 5/2001 | Marsden | ............... | H04N 1/6058 |
| | | | | 345/590 |
| 8,654,141 B2 * | 2/2014 | Zhang | ...................... | H04N 9/67 |
| | | | | 345/590 |

(Continued)

FOREIGN PATENT DOCUMENTS

| CN | 107958470 A * | 4/2014 | ............... G06T 7/90 |
| JP | 2007208629 A | 8/2007 | |

(Continued)

OTHER PUBLICATIONS

PCT/US2019/043309, "International Search Report and Written Opinion", dated Oct. 18, 2019, 7 pages.

(Continued)

*Primary Examiner* — Jennifer Mehmood
*Assistant Examiner* — Donna J. Ricks
(74) *Attorney, Agent, or Firm* — Kilpatrick Townsend & Stockton LLP

(57) ABSTRACT

A method for calibrating a wearable device includes displaying an image with a plurality of pixels for each of three primary colors using the wearable device, and determining RGB and XYZ values for each of the plurality of pixels. The method includes selecting a subset of the plurality of pixels to form a group of grid points, and dividing the image into a group of tile regions, with each tile region including a grid point. Grid XYZ values are determined for each grid point, based on averaging XYZ values of all pixels in a corresponding tile region, and a grid RGB-to-XYZ conversion matrix is determined for each grid point. The method also includes determining a correction matrix for each grid point by multiplying an inverse of the grid RGB-to-XYZ conversion matrix for the grid with an sRGB-to-XYZ conversion matrix.

20 Claims, 15 Drawing Sheets

(51) Int. Cl.
  *G09G 5/02* (2006.01)
  *G09G 3/20* (2006.01)
  *G06T 19/00* (2011.01)
  *G06F 3/01* (2006.01)
  *H04N 9/69* (2006.01)
(52) U.S. Cl.
  CPC ............ *G09G 3/2003* (2013.01); *G09G 5/026* (2013.01); *H04N 9/69* (2013.01); *H04N 17/04* (2013.01)
(58) Field of Classification Search
  CPC ......... G09G 3/2003; G09G 2320/0693; G09G 5/02; G09G 2360/145; G09G 2340/06; G09G 2320/0666; G09G 3/001; G06F 3/011; G06F 3/147; G02B 2027/014; G02B 2027/0123; G02B 2027/0118; G02B 2027/0112; G02B 2027/0178; G02B 27/017
  See application file for complete search history.

(56) References Cited

U.S. PATENT DOCUMENTS

| | | | |
|---|---|---|---|
| 2002/0122044 A1* | 9/2002 | Deering | H04N 9/73 345/597 |
| 2003/0151667 A1* | 8/2003 | Nakami | H04N 1/40 348/207.1 |
| 2005/0078187 A1 | 4/2005 | Fabricius et al. | |
| 2005/0213128 A1* | 9/2005 | Imai | H04N 1/6077 358/1.9 |
| 2006/0158881 A1 | 7/2006 | Dowling | |
| 2008/0088858 A1* | 4/2008 | Marcu | H04N 1/6086 358/1.6 |
| 2011/0285763 A1* | 11/2011 | Bassi | G09G 3/2003 345/694 |
| 2013/0050504 A1 | 2/2013 | Safaee-Rad et al. | |
| 2014/0176591 A1 | 6/2014 | Klein et al. | |
| 2014/0218386 A1 | 8/2014 | Tatsuno et al. | |
| 2014/0232923 A1 | 8/2014 | Koh et al. | |
| 2015/0002542 A1 | 1/2015 | Chan et al. | |
| 2015/0350492 A1 | 12/2015 | Kurtz et al. | |
| 2016/0117993 A1 | 4/2016 | Buckley et al. | |
| 2016/0370231 A1 | 12/2016 | Agahian et al. | |
| 2017/0261830 A1 | 9/2017 | Luten et al. | |
| 2019/0237008 A1* | 8/2019 | Ho | H01L 27/3269 |

FOREIGN PATENT DOCUMENTS

| | | | |
|---|---|---|---|
| JP | 2010217645 A | 9/2010 | |
| JP | 2013225802 A * | 10/2013 | ............... G06T 1/00 |
| JP | WO 2015186605 A * | 12/2015 | ............. H04N 5/232 |
| JP | 2016006408 A | 1/2016 | |
| WO | 2020023675 A1 | 1/2020 | |
| WO | 2020028872 A1 | 2/2020 | |

OTHER PUBLICATIONS

PCT/US2019/043309, "International Preliminary Report on Patentability", dated Feb. 4, 2021, 6 pages.
PCT/US2019/044999, "International Preliminary Report on Patentability", dated Feb. 18, 2021, 10 pages.
PCT/US2019/044999, "International Search Report and Written Opinion", dated Oct. 21, 2019, 12 pages.
Ruppertsberg, et al., "Displaying Colourimetrically Calibrated Images on a High Dynamic Range Display", Journal of Visual Communication and Image, vol. 18, Issue 5, Jul. 25, 2007, pp. 429-438.
AU2018234921, "First Examination Report", dated Mar. 11, 2021, 4 pages.
Application No. EP19844175.0, Extended European Search Report, dated Sep. 15, 2021, 9 pages.

* cited by examiner

METHOD AND SYSTEM FOR SUBGRID CALIBRATION OF A DISPLAY DEVICE

CROSS-REFERENCES TO RELATED APPLICATIONS

This application claims the benefit of priority to U.S. Provisional Patent Application No. 62/714,502, filed Aug. 3, 2018, entitled "METHOD AND SYSTEM FOR SUBGRID CALIBRATION OF A DISPLAY DEVICE," the contents of which is hereby incorporated by reference in its entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality (VR) scenario typically involves presentation of digital or virtual image information without transparency to other actual real-world visual input; an augmented reality (AR) scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

Embodiments of the present invention are directed generally to augmented reality systems, particularly, display systems. Some embodiments of the present invention are directed to the calibration of a wearable display in a VR or AR device. As described herein, subgrid analysis is utilized in some embodiments to improve the chromaticity uniformity across a waveguide display.

According to some embodiments, a method for calibrating a wearable device includes displaying an image with a plurality of pixels for each of three primary colors using the wearable device, and determining RGB and XYZ values for each of the plurality of pixels. The method includes selecting a subset of the plurality of pixels to form a group of grid points, and dividing the image into a group of tile regions, with each tile region including a grid point. Grid XYZ values are determined for each grid point, based on averaging XYZ values of all pixels in a corresponding tile region, and a grid RGB-to-XYZ conversion matrix is determined for each grid point. The method also includes determining a correction matrix for each grid point by multiplying an inverse of the grid RGB-to-XYZ conversion matrix for the grid with an sRGB-to-XYZ conversion matrix.

In some embodiments of the above method, the method also includes forming a correction matrix for each pixel that is a grid point using the correction matrix for the grid point, and forming a correction matrix for each pixel that is not a grid point by interpolation from correction matrices of adjacent grid points. In some embodiments, the interpolation is performed using bilinear interpolation. In alternative embodiments, the interpolation is performed using barycentric interpolation.

In some embodiments, the method also includes receiving color values for a pixel for an intended content as defined in a target color space, applying the correction matrix for each pixel to the received color values to generate corrected color values, and sending the corrected color values to in the wearable device for displaying the intended content.

In some embodiments, the method also includes applying a gamma to corrected color values. In some embodiments, the method also includes scaling down the corrected color values to improve intensity uniformity.

In some embodiments, the method can include receiving color values for a pixel for an intended content as defined in a target color space, applying the correction matrix for each grid point to the received color values to generate new color values, interpolating pixel color values for each pixel using the new color values for adjacent grid points, and sending the interpolated new color values to the wearable device for displaying the intended content.

In some embodiments, determining RGB and XYZ values for each of the plurality of pixels includes capturing RGB values using a digital camera and converting the RGB values to XYZ values.

In some embodiments, determining RGB and XYZ values for each of the plurality of pixels includes capturing RGB and XYZ values using spectroradiometer.

In some embodiments of the above method, the method can include receiving color values for a pixel for an intended content as defined in a target color space, applying the correction matrix for each grid point to the received color values to generate new color values, interpolating pixel color values for each pixel using the new color values for adjacent grid points, and sending the interpolated new color values to the wearable device for displaying the intended content.

According to some embodiments, a method for calibrating a wearable device includes displaying an image for each of three primary colors by a wearable display device, and capturing the image in M by N pixels using a digital color camera, where M and N are integers, with the digital color camera providing RGB values for each pixel. The method also includes converting the RGB values for each of the pixels of the image to XYZ values using a camera conversion matrix that converts RGB values to corresponding XYZ values. The method also includes selecting K by L grid points from the M by N pixels, where K and L are integers smaller than M and N, and dividing the image into K by L tile regions, with each tile region including a grid point. The method further includes determining grid XYZ values for each grid point, based on averaging XYZ values of all pixels in a corresponding tile region, and determining a grid RGB-to-XYZ conversion matrix for each grid point that converts the RGB values at the grid point to the XYZ values of the grid point. The method also includes determining a correction matrix for each pixel by multiplying an inverse of the grid RGB-to-XYZ conversion matrix for the pixel with an sRGB-to-XYZ conversion matrix.

In some embodiments of the method, the correction matrix is an sRGB-to-display-RGB correction matrix that is configured to provide corrected display-RGB color values to the wearable device.

In some embodiments, the method also includes receiving color values for a pixel for an intended content as defined in a target color space, and determining if the pixel is a grid point. If the pixel is a grid point, the correction matrix for the grid point is used as the pixel correction matrix for the pixel. If the pixel is not a grid point, a pixel correction matrix for the pixel is determined by interpolation from correction matrices at adjacent grid points, wherein each matrix element of the correction matrix is interpolated from corresponding matrix elements in correction matrices at adjacent grid points. The method further includes applying the pixel correction matrix for the pixel point to the received color values to generate new color values, and sending the corrected color values to in the wearable device for displaying the intended content.

In some embodiments, the interpolation is performed using bilinear interpolation. In some embodiments, the interpolation is performed using barycentric interpolation.

In some embodiments, the method also includes linearizing received color values. In some embodiments, the method also includes applying a gamma to the new color values. In some embodiments, the method also includes scaling down the grid point color values to improve intensity uniformity.

According to some embodiments of the invention, a system for calibrating a wearable display device includes a digital color camera disposed to capture an image display by the wearable display device. The digital color camera is configured to provide RGB values for each of a plurality of pixels of the image. The system also has a first processor for converting the RGB values provided by the camera to XYZ values. The first processor is also configured for selecting a subset of the plurality of pixels to form a group of grid points, and dividing the image into a group of tile regions, each tile region including a grid point. The first processor is also configures for determining grid XYZ values for each grid point, based on averaging XYZ values of all pixels in a corresponding tile region, and determining a grid RGB-to-XYZ conversion matrix for each grid point. Further, the first processor is configured for determining a correction matrix for each pixel by multiplying an inverse of the grid RGB-to-XYZ conversion matrix for the pixel with an sRGB-to-XYZ conversion matrix.

In some embodiments, the system is further configured to form a correction matrix for each pixel that is not a grid point by interpolation from correction matrices of adjacent grid points.

In some embodiments, the system is further configured for receiving color values for a pixel for an intended content as defined in a target color space, applying the pixel correction matrix for the grid point to the received color values to generate new color values, and sending the corrected color values to in the wearable device for displaying the intended content.

According to some embodiments, a method for calibrating a wearable device can include displaying an image with a plurality of pixels for each of three primary colors using the wearable device, and determining RGB and XYZ values for each of the plurality of pixels. The method includes determining a pixel RGB-to-XYZ conversion matrix for each pixel. Further, the method can determine a correction matrix for each pixel by multiplying an inverse of the pixel RGB-to-XYZ conversion matrix for the pixel with an sRGB-to-XYZ conversion matrix. To apply correction to the display, the method includes receiving color values for each pixel for an intended content as defined in a target color space, applying the correction matrix for each pixel to the received color values to generate corrected color values, and sending the corrected color values to the wearable device for displaying the intended content.

For example, in some embodiments, a method for calibrating a wearable device can include displaying an image with a plurality of pixels for each of three primary colors using the wearable device, and determining RGB and XYZ values for each of the plurality of pixels. The method includes determining a pixel RGB-to-XYZ conversion matrix for each pixel. Further, the method can determine a correction matrix for each pixel by multiplying an inverse of the pixel RGB-to-XYZ conversion matrix for the pixel with an sRGB-to-XYZ conversion matrix. To apply correction to the display, the method includes receiving color values for each pixel for an intended content as defined in a target color space, applying the correction matrix for each pixel to the received color values to generate corrected color values, and sending the corrected color values to the wearable device for displaying the intended content.

Numerous benefits are achieved by way of the present invention over conventional techniques. For example, embodiments of the present invention provide methods and systems for using a low-cost digital color camera to calibrate a wearable display device. Embodiments of the present invention provide methods and systems for determining a conversion model from the digital camera specific RGB color space to the CIE XYZ color space. The conversion model can then be applied to digital color cameras for measuring absolute chromaticity and luminance of the virtual images. The calibrated low-cost digital cameras can be used in large quantities in a production environment for the calibration of a large number of wearable display devices. Further, embodiments of the present invention provide methods and systems for subgrid analysis to improve the chromaticity uniformity across a waveguide display. Further, image tiling techniques are provided that can reduce the complexity and cost of grid-by-grid correction.

These and other embodiments of the invention along with many of its advantages and features are described in more detail in conjunction with the text below and attached figures.

BRIEF DESCRIPTION OF THE DRAWINGS

FIG. 7C is a simplified diagram illustrating a portion of a display image field according to some embodiments of the invention.

DETAILED DESCRIPTION OF THE SPECIFIC EMBODIMENTS

Embodiments of the present invention are directed characterization of a digital camera for use in the calibration of a wearable display device.

A display operated in native mode may not show the intended colors. Typically, a device may output colors using the three channels or primary colors of red, green, and blue. But, because the three primary colors used for those channels may be different from those used by the target color space (say, sRGB), the display device usually has a 3×3 matrix to colorimetrically transform the three sRGB values into three numbers for the display's red, green, and blue, such that when sent to the device, it will output the originally-intended color. The LEDs used in the display device may not only have primary colors different from those of the target's color space, but the colors shift in both chromaticity (x, y) and intensity (Y) after their spectra pass through the optics, making the color changes vary depending on the location on the display. For example, the color displayed by a wearable device can be non-uniform. For example, in a wearable device that includes a waveguide display, the optical components can narrow the color spectrum and/or shift the color spectrum. Further, color shifts can occur from the user's temple side to the nasal side. Color variations can also be caused by other factors. Therefore, it is desirable to apply pixel-by-pixel calibration and correction to obtain a uniform output color over the field of view.

Figure 1:
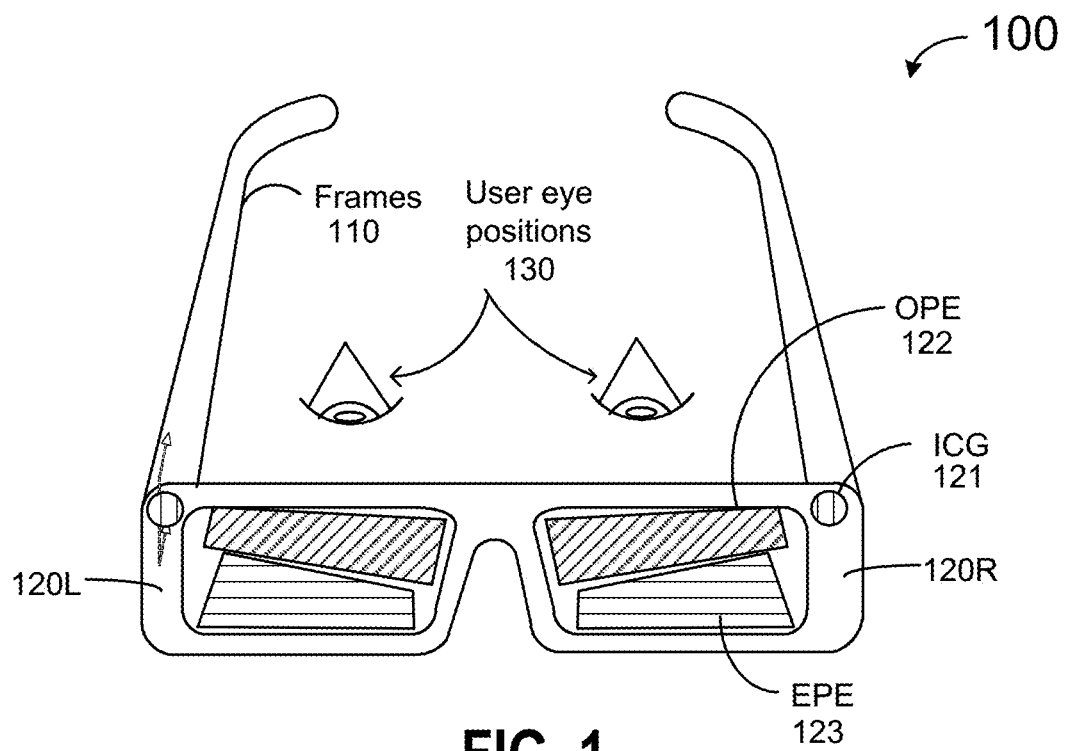
FIG. 1 is a perspective view of an exemplary augmented reality glasses according to some embodiments.

FIG. 1 is a perspective view of an exemplary wearable display device 100 according to some embodiments. In this example, wearable display device 100 can be a pair of augmented reality glasses. As shown in FIG. 1, wearable display device 100 can include frames 110 supporting a left waveguide eyepiece 120L and a right waveguide eyepiece 120R. Each waveguide eyepiece 120L and 120R can include an input coupling grating (ICG) 121, an orthogonal pupil expander (OPE) 122, and an exit pupil expander (EPE) 123. The input coupling grating is also referred to as the input coupling port. The input coupling grating (ICG) 121, orthogonal pupil expander (OPE) 122, and exit pupil expander (EPE) 123 can be suitable diffractive optical elements (DOEs). For example, they can take the form of gratings formed on an optical waveguide. According to certain embodiments, rather than providing a single waveguide for each eyepiece, each eyepiece can have a stack of multiple optical waveguides, for different colors and with different optical power EPEs. The EPEs are configured to project images that can be viewed from the user eye positions 130.

In FIG. 1, incoming light, which can be image light or a scanning light beam, can incident upon the ICG (121) of each eyepiece 120L, 120R. Each ICG 121 couples the incoming light into guided mode propagating in a direction toward the OPE region 122. The eyepiece propagates the image light by total internal reflection (TIR). The OPE region 122 of each eyepiece 120L, 120R can also include a diffractive element that couples and redirects a portion of the image light propagating in the eyepiece 120L, 120R toward the EPE region 123. The EPE region 123 includes a diffractive element that couples and directs a portion of the light propagating in each eyepiece 120L, 120R in a direction outward from the plane of the eyepiece layer 120 toward the viewer's eye positions 130. In this fashion, an image may be viewed by the viewer.

The incoming light may include light in the three primary colors, namely blue (B), green (G), and red (R).

In some applications, the eyepiece can accept collimated light which is scanned in two degrees of freedom. Each instantaneous angle of incidence (or small range of angle of incidence) corresponds to an angularly defined pixel. In some embodiments, the light can be configured to simulate a virtual object, which can appear to be some distance, e.g., half a meter to a meter, away from the viewer.

Figure 2:
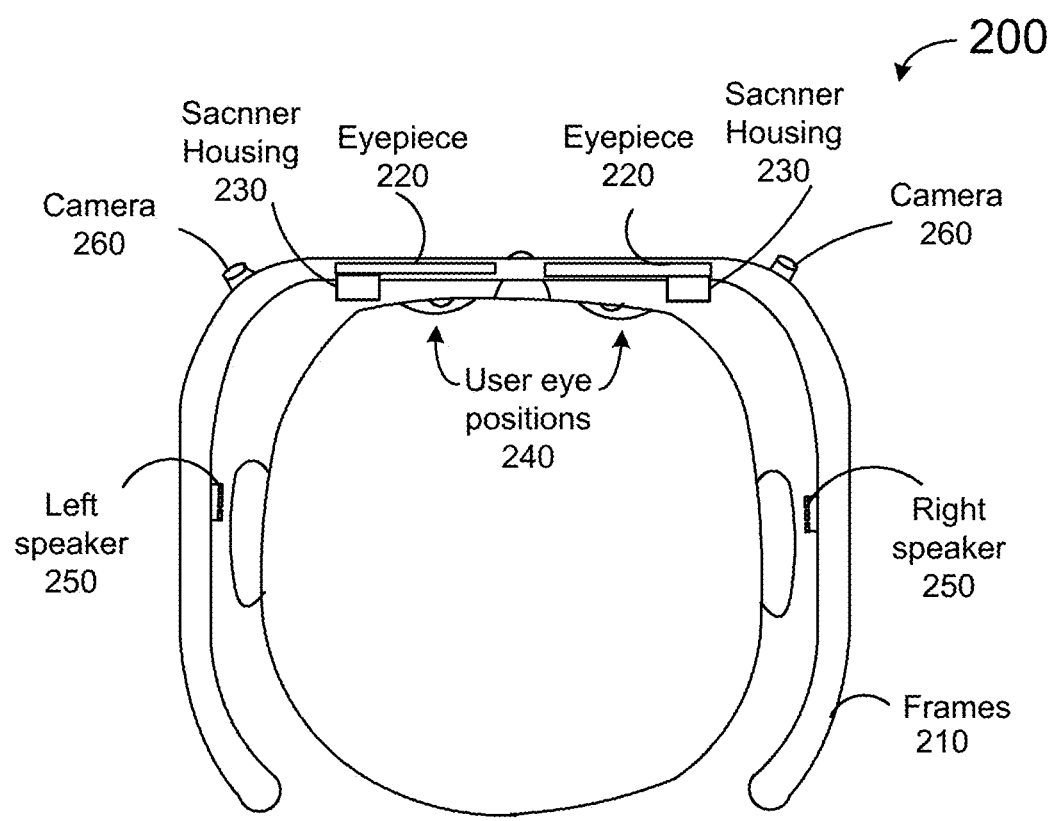
FIG. 2 is a top view of an exemplary augmented reality glasses according to some embodiments.

FIG. 2 is a top view of an exemplary wearable display device 200 according to some embodiments. In this example, wearable display device 200 can be a pair of augmented reality glasses. As shown in FIG. 2, wearable display device 200 can include frames 210 and eyepieces 220. Each eyepiece can be similar to eyepieces 120L and 120R in FIG. 1 and can include an ICG, an OPE, and an EPE, which are not visible in the top view. Wearable display device 200 can also include a scanner housings 230, which can include a scanning mirror for forming a virtual image (e.g., at infinity) from incoming light sources. In some embodiments, the ICGs are used as input ports for receiving light. The images formed by the eyepiece can be viewed from user eye positions 240. The augmented reality glasses can also have left and right speakers 250 and cameras 260.

As described above, the incoming light may include light in the three primary colors, namely blue (B), green (G), and red (R). In some embodiments, the light beams in the incoming light are combined in an optical combiner. For a wearable device for VR and AR applications, it is desirable that the optical combiners in the system are compact and light weight.

Figure 3:
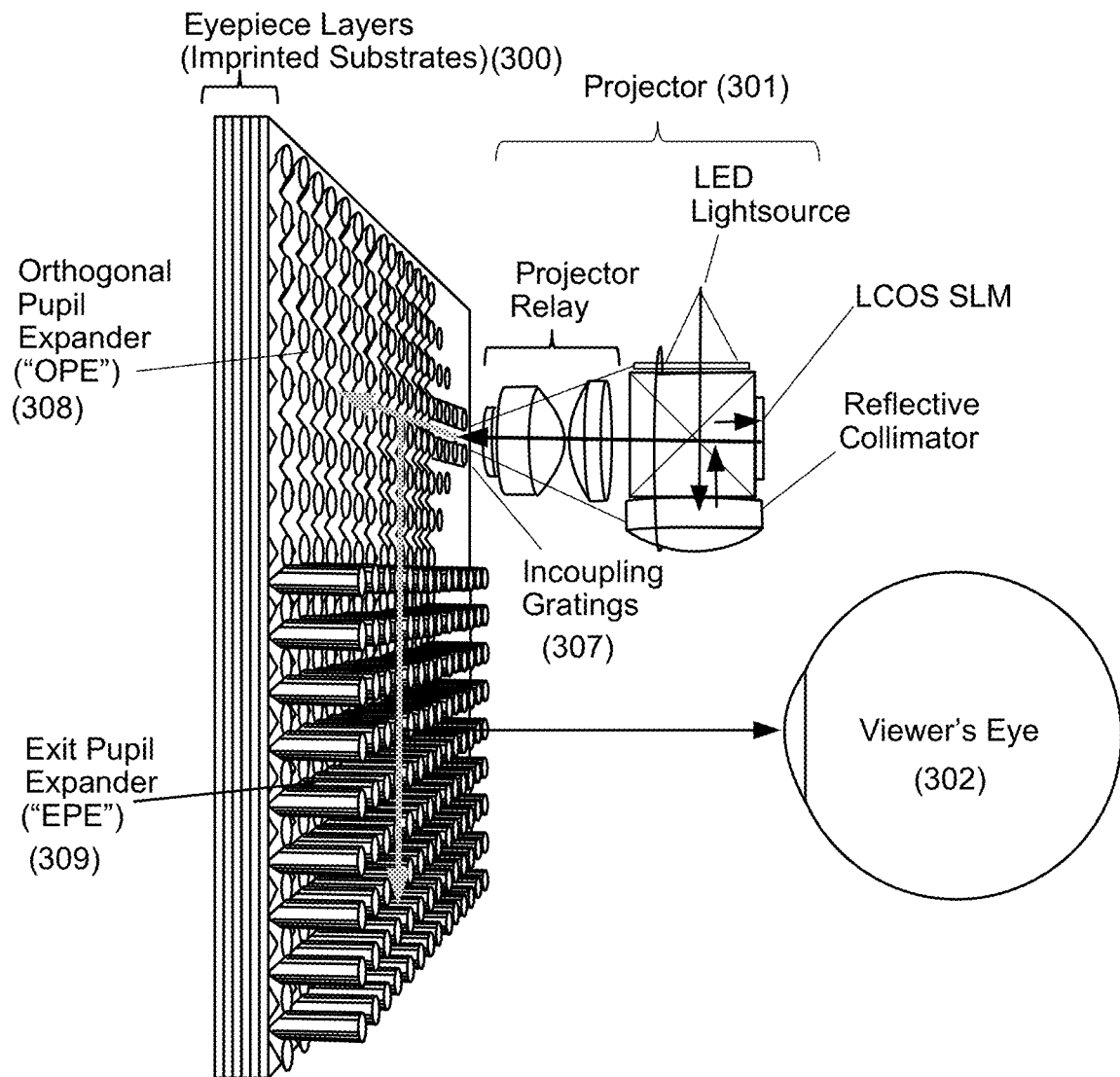
FIG. 3 is a schematic diagram illustrating the light paths in a viewing optics assembly (VOA) that may be used to present a digital or virtual image to a viewer according to some embodiments of the present invention.

FIG. 3 illustrates schematically the light paths in a viewing optics assembly (VOA) that may be used to present a digital or virtual image to a viewer, according to some embodiments of the present invention. The VOA includes a projector 301 and an eyepiece 300 that may be worn around a viewer's eye. In some embodiments, the projector 301 may include a group of red LEDs, a group of green LEDs, and a group of blue LEDs. For example, the projector 301 may include two red LEDs, two green LEDs, and two blue LEDs according to an embodiment. The eyepiece 300 may include one or more eyepiece layers. Projector 301 can also include a LCOS (Liquid Crystal on Silicon)-SLM (Spatial Light Modulator), and various optical elements such as a reflective collimator and a projector relay. In one embodiment, the eyepiece 300 includes three eyepiece layers, one eyepiece layer for each of the three primary colors, red, green, and blue. In another embodiment, the eyepiece 300 may include six eyepiece layers, i.e., one set of eyepiece layers for each of the three primary colors configured for forming a virtual image at one depth plane, and another set of eyepiece layers for each of the three primary colors configured for forming a virtual image at another depth plane. In other embodiments, the eyepiece 300 may include three or more eyepiece layers for each of the three primary colors for three or more different depth planes. Each eyepiece layer comprises a planar waveguide layer and may include an incoupling grating 307, an orthogonal pupil expander (OPE) region 308, and an exit pupil expander (EPE) region 309.

Still referring to FIG. 3, the projector 301 projects image light onto the incoupling grating 307 in eyepiece 300. The incoupling grating 307 couples the image light from the projector 301 into the planar waveguide layer propagating in a direction toward the OPE region 308. The waveguide layer propagates the image light in the horizontal direction by total internal reflection (TIR). The OPE region 308 of the eyepiece 300 also includes a diffractive element that couples and redirects a portion of the image light propagating in the waveguide layer toward the EPE region 309. The EPE region 309 includes an diffractive element that couples and directs a portion of the image light propagating in the waveguide layer in a direction approximately perpendicular to the plane of the eyepiece 300 toward a viewer's eye 302. In this fashion, an image projected by projector 301 may be viewed by the viewer's eye 302.

As described above, image light generated by the projector may include light in the three primary colors, namely blue (B), green (G), and red (R). Such image light can be separated into the constituent colors, so that image light in each constituent color may be coupled to a respective waveguide layer in the eyepiece.

In some embodiments, the color displayed by a wearable device can be calibrated by measuring the wearable output with an eye-proxy camera at the eye position and compared with target display values. The measurement can be carried out at a larger FOV (field of view), and can be close to the full FOV of the camera. Digital color cameras measure color in RGB space. To represent human perception of the color, data in the camera's RGB space can be transformed from the camera's RGB space to the eye's XYZ space or other absolute color space, e.g., as defined in the CIE 1931 color space. Once the output of the wearable device can be described in the absolute color space, adjustments can be applied to the colors to obtain the desired virtual image, for example, a uniform white color over the entire image.

Figure 4A:
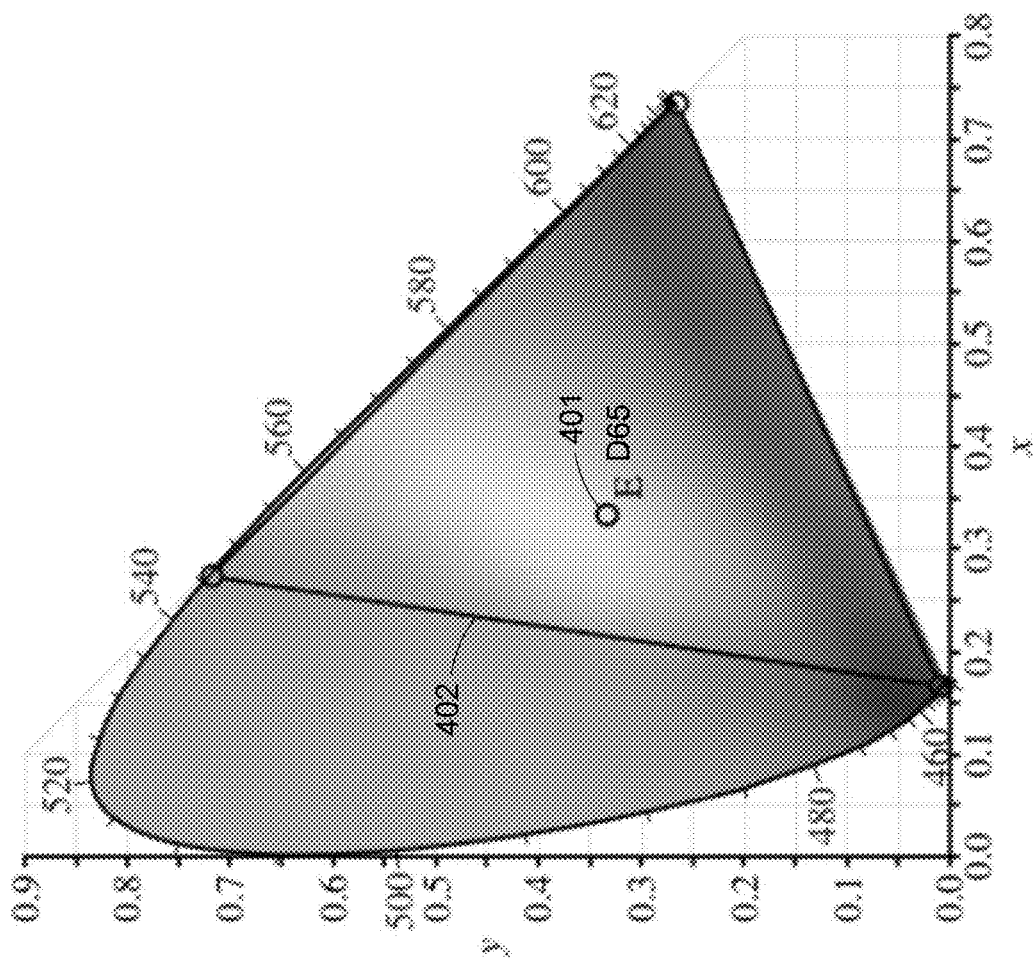
FIG. 4A is diagram illustrating the CIE 1931 color space chromaticity diagram.

FIG. 4A is a diagram illustrating the CIE 1931 color space chromaticity diagram. The CIE XYZ color space encompasses all color sensations that are visible to a person with average eyesight. The CIE XYZ (Tristimulus values) is a device-invariant representation of color. It serves as a standard reference against which many other color spaces are defined. In FIG. 4A, point 401 denotes D65 (or CIE Standard Illuminant D65) is a commonly used standard illuminant defined by the International Commission on Illumination (CIE). It is used to portray standard illumination conditions at open-air in different parts of the world. FIG. 4A also illustrates the sRGB color space 402. The sRGB (standard Red Green Blue) color space is an RGB color space that Hewlett Packard and Microsoft created cooperatively in 1996 to use on monitors, printers, and the Internet. It was subsequently standardized and is often the "default" color space for images. It is understood, however, that other color spaces can also be used with the embodiments described here.

Figure 4B:
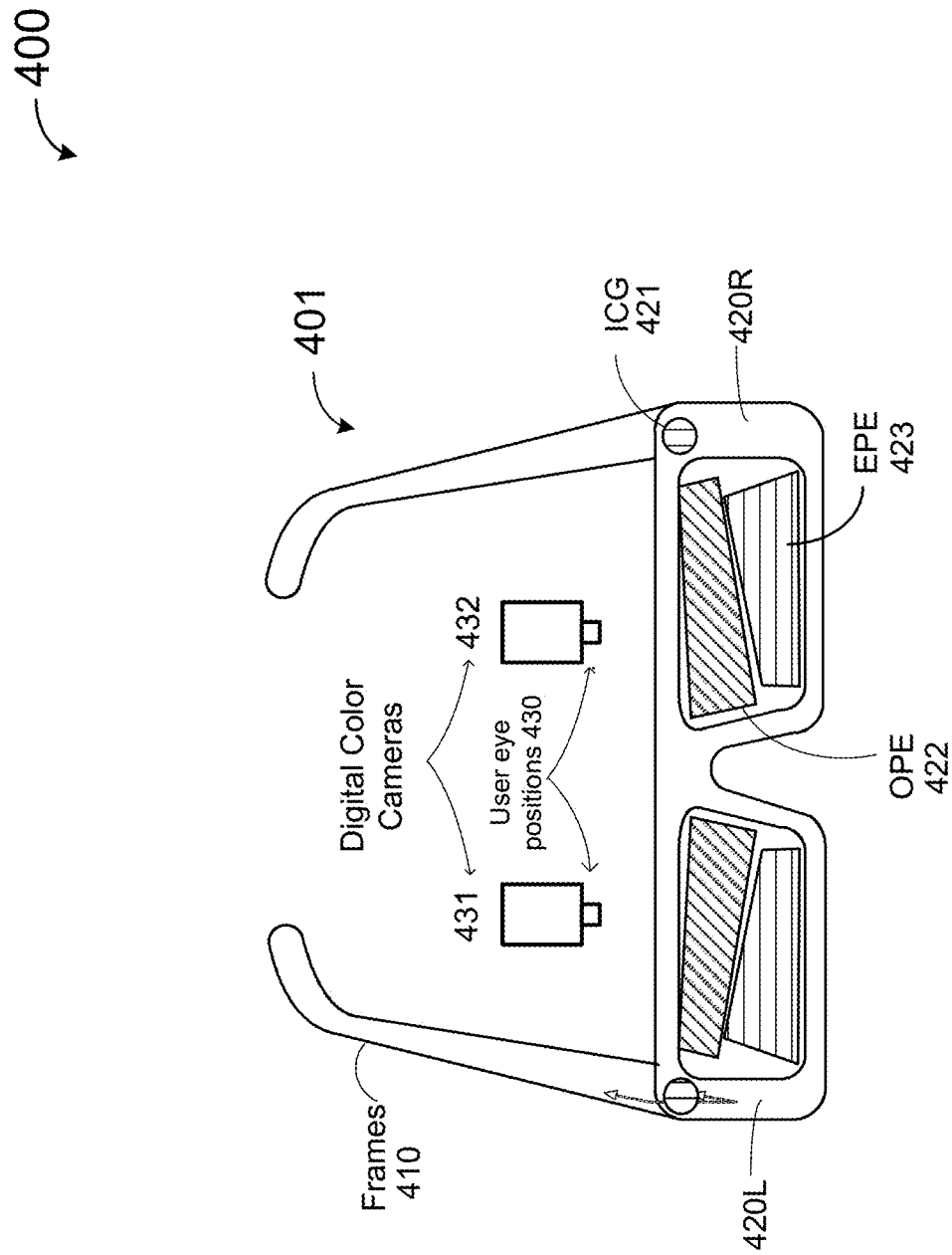
FIG. 4B is a simplified schematic diagram illustrating a method for calibrating a wearable device according to some embodiments of the present invention.

FIG. 4B is a simplified schematic diagram illustrating a method for calibrating a wearable display device according to some embodiments of the present invention. In FIG. 4B, a wearable display device 400 is similar to the exemplary wearable display device 100 illustrated above in FIG. 1. In this example, wearable display device 400 can be a pair of glasses for augmented reality applications. As shown in FIG. 4, wearable display device 400 can include frames 410 supporting a left waveguide eyepiece 420L and a right waveguide eyepiece 420R. Each waveguide eyepiece 420L and 420R can include an input coupling grating (ICG) 421, an orthogonal pupil expander (OPE) 422, and an exit pupil expander (EPE) 423. The input coupling grating may also be referred to as an input coupling port. The input coupling grating (ICG) 421, orthogonal pupil expander (OPE) 422, and exit pupil expander (EPE) 423 can be suitable diffractive optical elements (DOEs). For example, they can take the form of gratings formed on an optical waveguide. Each eyepiece can have a stack of multiple optical waveguides, for different colors and with different optical power EPEs. The EPEs are configured to project images that can be viewed from the user eye positions 430.

In embodiments of the invention, for the calibration of the wearable device 400, digital color cameras 431 and 432 are disposed or positioned at the user eye positions 430, that is, positioned where the users' eyes would be located during use of the wearable device. In some embodiments, a spectroradiometer can be used to measure the displayed image light of a display device and determine the output color in an absolute color space, such as the CIE XYZ color space. However, spectroradiometers are often too bulky for the measurement of a wearable device as shown in FIG. 4B. Further, spectroradiometers are also expensive, limiting their use in large quantities in a production environment for the calibration of a large number of wearable display devices. Moreover, some methods only calibrate the white color using a white light input. Therefore, conventional systems and methods are not suitable for the calibration of wearable devices using field sequential color displays.

Accordingly, in some embodiments of the invention, the color displayed by a wearable device can be calibrated by measuring the wearable output with low-cost digital color cameras, also referred to as eye-proxy cameras, that are located at the eye position. Accordingly, eye-proxy cameras are used as a color measurement devices in embodiments of the present invention that can be implemented in a high-volume production environment. Digital color cameras provide the color measurements in RGB space. To represent human perception of the color, data in the camera's RGB space is mapped from the camera's RGB space to the eye's XYZ space, e.g., as defined in CIE 1931 color space. Once the output of the wearable device is described in the absolute color space, adjustments can be applied to the input color data to obtain the desired colors in the virtual image.

Figure 5A:
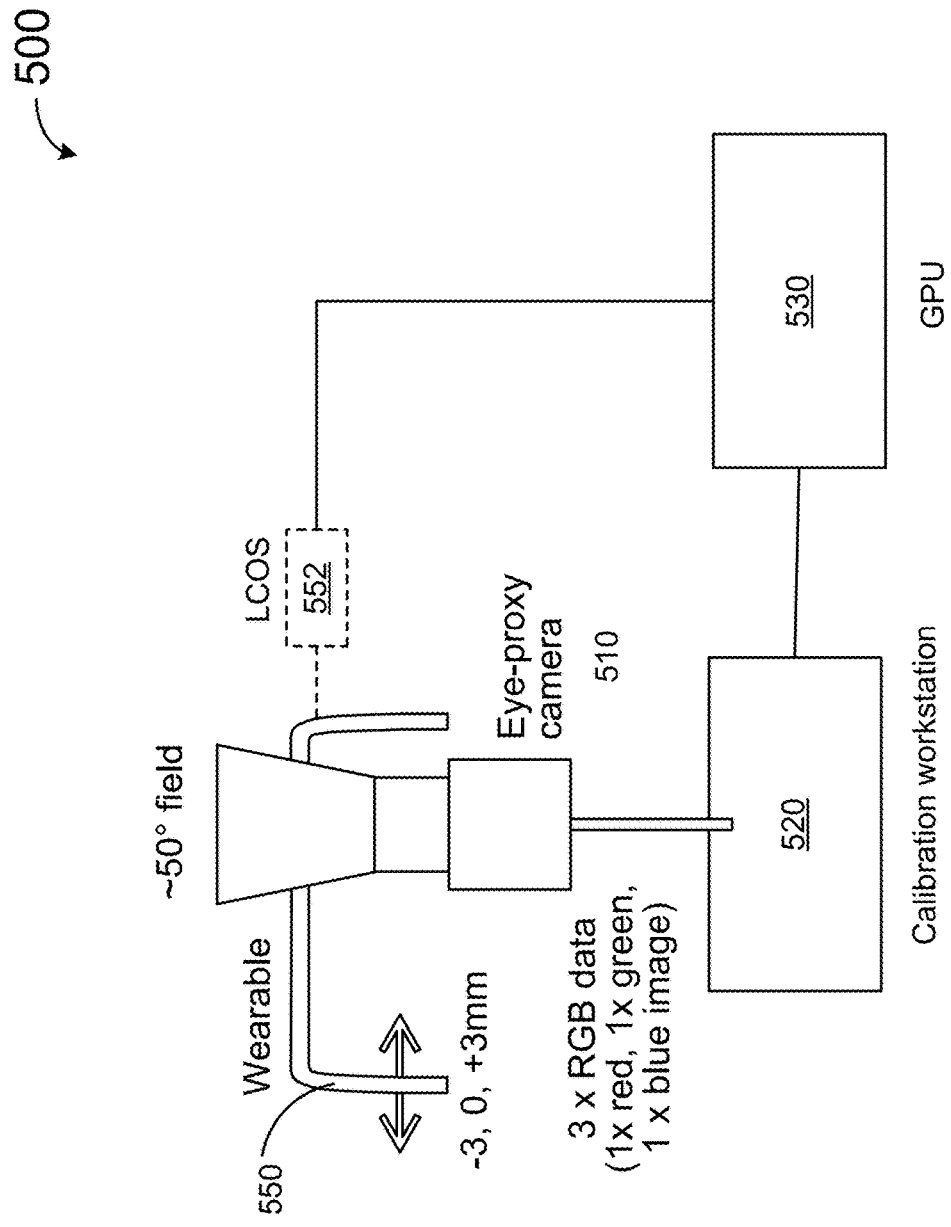
FIG. 5A is a simplified schematic diagram illustrating a system for calibrating a wearable device according to some embodiments of the present invention.
Figure 5B:
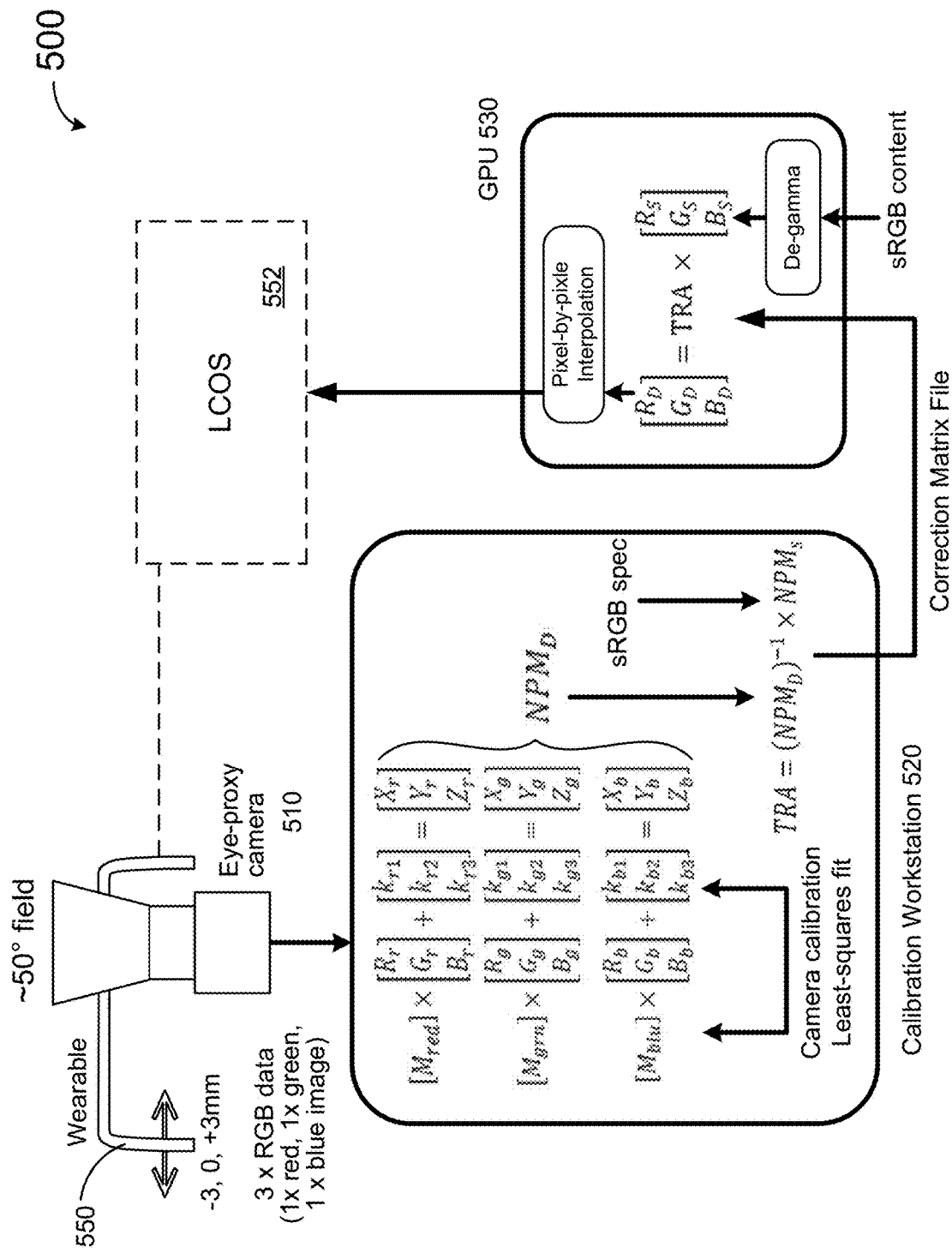
FIG. 5B is a simplified schematic diagram illustrating a system for calibrating a wearable device according to another embodiment of the present invention.

FIG. 5A is a simplified schematic diagram illustrating a system for calibrating a wearable device according to some embodiment of the present invention. FIG. 5B is a simplified schematic diagram illustrating the calibration system 500 with certain functions illustrated according to another embodiment of the present invention. As shown in FIGS. 5A and 5B, a calibration system 500 is implemented for measuring one side of the wearable device, which is associated with one eye. The extension of the system to the testing of the second eye will be evident to one of skill in the art. The calibration system 500 can include an eye-proxy camera 510, a calibration workstation 520, and a GPU 530. The calibration workstation is also referred to as first processor, and the GPU (graphic processing unit) is also referred to as a second processor. In some embodiments, the first and second processors can be part of the same computer system.

Referring to FIGS. 5A and 5B, wearable device 550 to be calibrated is optically coupled to eye-proxy camera 510. The output of the eye-proxy camera 510 is provided to calibration workstation 520. The output from the calibration workstation, which has a correction matrix TRA for each of the grid points, is provided as an input to GPU 530. GPU 530 is configured to receive color values for a pixel for an intended content as defined in a target color space, and apply the correction matrix for each grid point to the received color values to generate new color values. Further, the GPU can be configured to interpolate pixel color values for each pixel using the new color values for adjacent grid points. The GPU also sends the new color values to the wearable device for displaying the intended content.

Eye-proxy camera 510 can be a digital color camera. For example, low-cost, small commercial and industrial color cameras can be used. During calibration, the camera can be installed adjacent to a wearable device in a station. Two cameras can be used side by side to measure the wearable device's display output for the left and right eyes concurrently or simultaneously, as illustrated in FIG. 4B. To simplify the illustration, only one camera 510 is shown positioned at a conjugate distance from a wearable device 550. The position of the wearable device 550 can be shifted to different positions relative to the camera to account for possible color shift with changes in eye position, inter-pupil distance, and movement of the user, etc. Merely as an example, the wearable device 550 is shown to be shifted in three lateral locations, at −3, 0, and +3 mm. In addition, the relative angles of the wearable device with respect to the camera can also be varied to provide additional calibration conditions.

The wearable device 550 can include one or more light sources (also referred to as image light sources) such LEDs or lasers. In some embodiments, an LCOS projector can be used to provide the display images. The LCOS projector can be built into the wearable device 550. However, in FIGS. 5A and 5B, LCOS 552 is shown outside the wearable device 550 for purposes of illustration and clarity. During calibration, image light is projected by the wearable device 550 in field sequential color order, for example, in the sequence of red image, green image, and blue image. In a field-sequential color system, the primary color information is transmitted in successive images, which at least partially relies on the human vision system to fuse the successive images into a color picture. The eye-proxy camera 510 captures the images as pixels in the camera's RGB color space and provides the data to the calibration workstation 520.

The color values for a pixel in the wearable device 550 for an intended content is defined in a target color space by, for example, a content provider. In the examples described here, the content in is specified in color values in the sRGB (Standard Red Green Blue) color space. However, it is understood that other color spaces can be used to define the content, and the description provided here are applicable.

In the examples described here, calibration workstation 520 is configured to convert the image data in the camera's RGB space to the CIE XYZ color space. In some embodiments, calibration workstation 520 can capture images in the camera's RGB space and corresponding measurement values in the XYZ space of a spectroradiometer. The spectroradiometer can capture spectrum and/or CIE XYZ values of the light from, for example, an integrating sphere. In some embodiments, the spectroradiometer can measure the xyY values and derive the CIE XYZ values. The spectroradiometer can also convert the spectrum or XYZ values to CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space), or some other appropriate absolute color space.

Figure 5C:
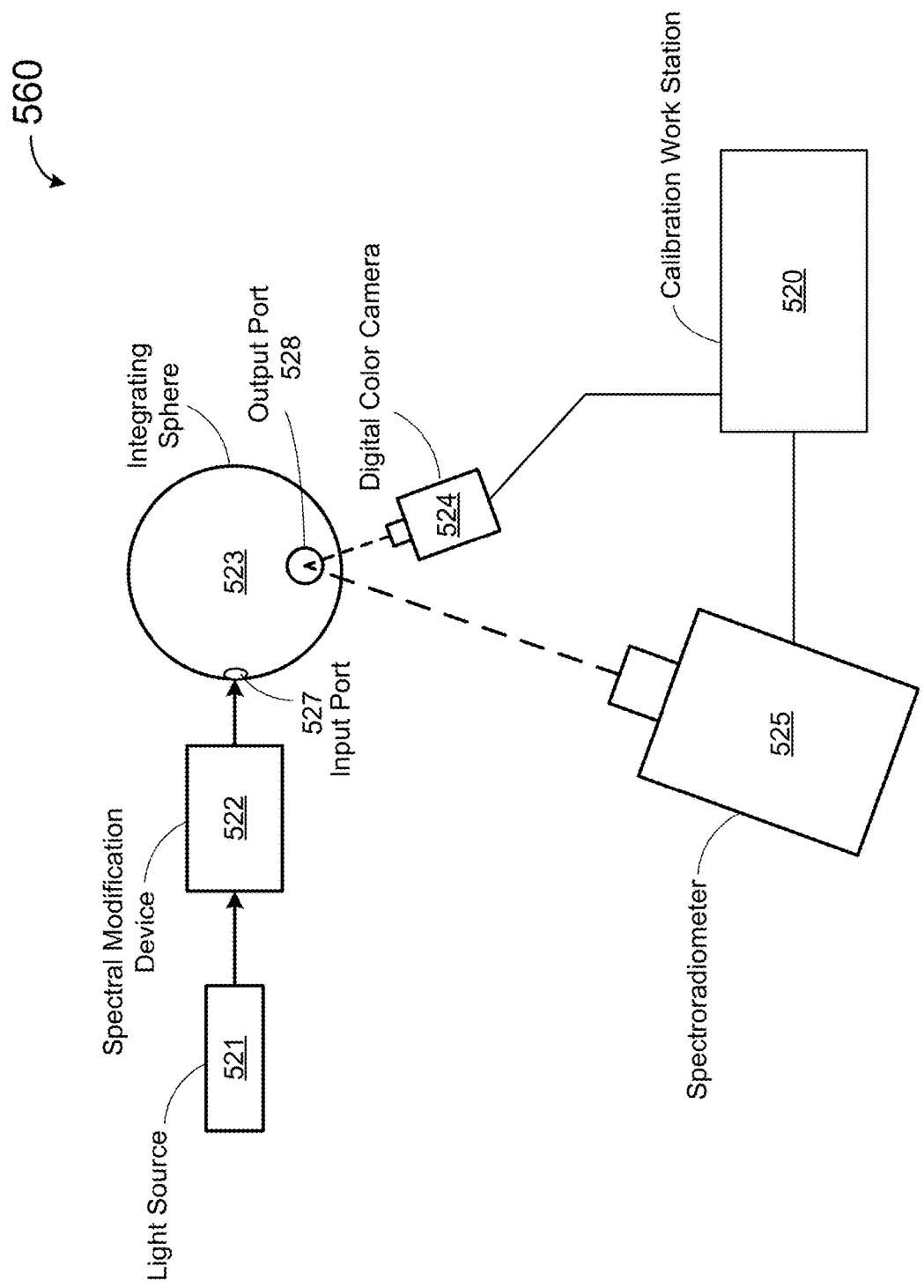
FIG. 5C is a simplified block diagram illustrating a system for characterizing a digital color camera according to some embodiments of the present invention.

FIG. 5C is a simplified block diagram illustrating a system for characterizing a digital color camera according to some embodiments of the present invention As shown in FIG. 5C, calibration system 560 can include a light source 521, a spectral modification device 522, an integrating sphere 523, a digital color camera 524, a spectroradiometer 525, and a calibration work station 520. The integrating sphere 523 is an example of a display device, and other kinds of display devices can also be used. The spectroradiometer 525 is an example of a color-measurement device, and other types of color-measurement device can be used instead of the spectroradiometer 525. System 560 is configured to determine a conversion model between each displayed color captured by the digital color camera RGB values and the color-measurement values in an absolute color space, e.g., XYZ values. The conversion model includes conversion matrices or equations for each of three primary colors used in a field sequential color virtual image.

Light source 521 and spectral modification device 522 are configured to illuminate the integrating sphere 523 with an input light beam of a primary color having spectral properties representative of a light beam in a virtual image in a wearable device. The digital color camera 524 captures an image of the display device and determines from the image RGB values for the primary color. The spectroradiometer 525 determines a color-measurement value, e.g., XYZ values, associated with each corresponding primary color at the display device, thereby acquiring a color-measurement value in an absolute color space. The calibration work station 520 is configured to determine a conversion model for each primary color using RGB values and the color-measurement values determined from training samples representing different illumination conditions.

In FIG. 5C, light source 521 can include LEDs or lasers for generating light beams of primary colors. Alternatively, light beams of the primary colors can be generated from a monochromator, which includes a white light source that can be filtered to provide different light colors. In some embodiments, the LEDs can be configured to emit light at different brightness levels, or grey levels. In an embodiment, the LEDs are configured at the highest grey level, 255, in a scale from 0-255. In order to characterize the digital color camera at different operating conditions, a broad set of training samples with spectral diversity can be generated by using different LEDs. For example, LED's from different bins of dies can be selected. Further, the light source 521 can include a controller that can vary the emission power of the LEDs, for example, at LED current levels of 10 mA, 50 mA, or 100 mA, etc., that can change the temperature of the LEDs. The controller can also modulate the LEDs with pulse width modulation (PWM) at various duty cycles, e.g., from 0 to 1.0. The PWM pulsing can change the thermal characteristic of the LEDs. Moreover, to add variety, outliner training samples can be generated by a combination of LEDs of different colors. For example, a training sample of a modified red color can be obtained with red light mixed with a small amount of green and blue. The color mixing can be achieved by PWM control, for example, with 1.0 PWM duty cycle for green and 0.05-0.2 PWM duty cycle for red and blue. As described further below, adding extra colors to a primary color can improve the stability of the computation process to determine the conversion matrix. Additional varieties of training samples can be obtained by leaving out a portion of a training set for a regression procedure, and leaving out a different portion for another regression procedure.

As described above, a wearable device can include various optical components, such as the waveguide and diffractive components. These optical components can modify the light beam spectrum. In order to provide input light beams that can emulate the output light in the wearable device, the spectrum properties of the wearable device is characterized. The spectral modification device 522 is configured to receive light beams from light source 521 and generate a light beam that is representative of the spectrum of light in a virtual image of the wearable device. For example, the spectral modification device 522 can change the center emission wavelength and the bandwidth of the input light beam. Depending on the embodiments, the spectral modification device 522 can include lens systems, filters, and diffusers, etc. For example, dichroic filters can be used to further narrow LED spectrum and increase saturation. Further, filters can be used to narrow the bandwidth of different colors. In some cases, rotating dichroic filters can be used to tune spectral wavelength to better mimic the wearable output, for example, with the filter positioned at different tilt angles for different colors.

In FIG. 5C, the integrating sphere 523 is an example of a display device. Alternatively, other display devices, such as a projection screen can also be used. An integrating sphere is an optical component consisting of a hollow spherical cavity with its interior covered with a diffuse white reflective coating, with small holes for input and output ports. Its relevant property is a uniform scattering or diffusing effect. An integrating sphere may be thought of as a diffuser which preserves power but destroys spatial information. As shown in FIG. 5C, System 560 uses an integrating sphere 523 as the display device. The integrating sphere can have an input port 527 for receiving the light beam from the spectral modification device 522, and an output port 528 to provide output light for measurement by digital color camera 524 and spectroradiometer 525. Alternatively, a projection screen can also be used as the display device.

The digital color camera 524 captures digital images in an array of N by M pixels. In a specific embodiment, the digital color camera 524 can have 1400 by 960 pixels. Color information in pixel is represented in the camera's RGB color space. For example, when a red light is emitted from the light source 521, the sensors in the digital camera 524 can sense light at the integrating sphere and can capture values of red, green, blue colors (Rr, Gr, Br) in each pixel in the camera's RGB color space. Similarly, for an input of green color, RGB data (Rg, Gg, Bg) is captured for each pixel. Further, for a input of blue color, RGB data (Rb, Gb, Bb) is captured for each pixel.

In System 560, the calibration work station 520 is configured to assemble training samples from the captured images in the camera's RGB space and corresponding spectroradiometer measurement values in the XYZ space of the spectroradiometer. The calibration work station 520 is coupled to spectroradiometer 525 and digital camera 524 through wired or wireless connections. As described further below, a diverse set of training samples can be gathered by varying the light source and spectrum. The calibration work station 520 then applies conversion methods to generate a transformation model from RGB training data to XYZ training data. Various conversion methods can be used, such as least square, linear regression, polynomial regression, or neural networks, etc. In addition, methods such as k-fold cross validation and leave-one-out cross validation can also be used to further optimize conversion robustness and accuracy.

For example, in a training sample for the red color, the camera captures the image in the camera's RGB space in the form of (Rr, Gr, Br) representing the red, green, and blue light sensed by the camera. Depending on the embodiments, the RGB data from all pixels of the camera, or a subset of the pixels, can be included in the training set. In some embodiments, for each image, the RGB value over all the pixels is used, since the output from the integrating sphere is substantially uniform. The corresponding spectroradiometer measurement in the form of (Xr, Yr, Zr) in the XYZ space for the red, green, and blue light components are generated by a spectroradiometer. A conversion matrix Mred can be derived by for the training samples for the red color with the following property, $$[M_{red}] \times \begin{bmatrix} R_r \\ G_r \\ B_r \end{bmatrix} + \begin{bmatrix} k_{r1} \\ k_{r2} \\ k_{r3} \end{bmatrix} = \begin{bmatrix} X_r \\ Y_r \\ Z_r \end{bmatrix}$$

where kr1, kr2, and kr3 are optional optimization parameters for the red color.

Similar procedures can be carried out for each of the primary colors. For example, a conversion matrix Mgrn is derived for the training samples for the green color such that, $$[M_{grn}] \times \begin{bmatrix} R_g \\ G_g \\ B_g \end{bmatrix} + \begin{bmatrix} k_{g1} \\ k_{g2} \\ k_{g3} \end{bmatrix} = \begin{bmatrix} X_g \\ Y_g \\ Z_g \end{bmatrix}$$

where kg1, kg2, and kg3 are optional optimization parameters for the green color.

Similarly, a conversion matrix Mblu is derived for the training samples for the blue color such that, $$[M_{blu}] \times \begin{bmatrix} R_b \\ G_b \\ B_b \end{bmatrix} + \begin{bmatrix} k_{b1} \\ k_{b2} \\ k_{b3} \end{bmatrix} = \begin{bmatrix} X_b \\ Y_b \\ Z_b \end{bmatrix}$$

where kb1, kb2, and kb3 are optional optimization parameters for the blue color.

The calibration workstation 520 is also configured to determine the correction to the color values based on the measured values and the intended color space. The GPU 530 is configured to apply that correction on the color values, which are then sent to the wearable device.

In order to perform pixel-by-pixel correction of a wearable display device, a correction matrix is used for each pixel. In some embodiments, the process can be carried out as follows. For each pixel point, a first matrix $NPM_D$, can be formed based on matrices $M_{red}$, $M_{grn}$, and $M_{blu}$ described above, that converts from the display's RGB values at that location to CIE XYZ values for each of the primary colors, red, green, and blue. An example of a 3×3 $NPM_D$ matrix is shown below.

$$\begin{bmatrix} X \\ Y \\ Z \end{bmatrix} = NPM_D \times \begin{bmatrix} R \\ G \\ B \end{bmatrix}$$

Next, a second matrix $NPM_S$ can determined that converts from sRGB (Standard Red Green Blue) values (or another target color space that is assumed for the content) to CIE XYZ values, assuming the content color is provided in the sRGB space. Examples of conversion matrix $NPM_S$ can be derived from known data or can be found in the public domain. An example of the 3×3 $NPM_S$ matrix is show below.

$$\begin{bmatrix} X \\ Y \\ Z \end{bmatrix} = NPM_S \times \begin{bmatrix} R_S \\ G_S \\ B_S \end{bmatrix}$$

Next, a correction matrix, or a transformation matrix, TRA, can be determined, by multiplying the fixed sRGB-to-XYZ matrix $NPM_S$ by the inverse of the display's RGB-to-XYZ matrix for that grid point $NPM_D$.

$$TRA = (NPM_D)^{-1} \times NPM_S$$

With the correction matrix TRA determined for each pixel, the sRGB content values [$R_S$ $G_S$ $B_S$] can be converted into a modified, or corrected, RGB content values [$R_D$ $G_D$ $B_D$] for the device to display the correct image. This conversion is shown as follows.

$$\begin{bmatrix} R_D \\ G_D \\ B_D \end{bmatrix} = TRA \times \begin{bmatrix} R_S \\ G_S \\ B_S \end{bmatrix}$$

In some implementations, it is desirable to perform pixel-by-pixel correction for all pixels of the display device. However, carrying out the calibration process for every pixel may be a strain on memory resources. Therefore, in other embodiments of the present invention, a lower resolution of correction can be applied, by using fewer correction points than the total number of pixels in the image. For example, a subset of the pixels can be selected as grid points for the computation. As another example, tile regions, or tile rectangles, can be formed that tessellate over the entire image, each one centered on a grid point. In an example, 81×61 grid points can be selected that span the display evenly from corner to corner. In other examples, 41×21 grid points, 21×16 grid points, or other values can be used. An average is taken of the individual XYZ values for each color channel over each tile region. The average XYZ values are designated for the grid point and the associated tile region. Thus, in this example, for each channel, there are three sets of 81×61 points, each corresponding to XYZ values.

In these embodiments, with the correction matrix TRA determined for each grid point, the sRGB content values [$R_S$ $G_S$ $B_S$] can be converted into a modified, or corrected, RGB content values [$R_D$ $G_D$ $B_D$] for the device to display the correct image. This conversion is carried out as follows.

$$\begin{bmatrix} R_D \\ G_D \\ B_D \end{bmatrix} = TRA \times \begin{bmatrix} R_S \\ G_S \\ B_S \end{bmatrix}$$

This is the matrix that will convert the intended sRGB values (for a pixel at a certain location) into values that, when sent to the display, will actually result in the originally-intended color. Note that since light can only be modulated to diminish it, the matrix is designed so that the chromaticities are the intended ones, and the luminance is the value that can be maximally achieved at that grid point, which would be lower than the luminance of the non-corrected color. Since this is a linear transform, and the incoming data is linear, all colors will be transformed in proportion to the luminance that could be achieved maximally at that grid point.

In some embodiments of the invention, color correction in the display device can be carried out as follows. For a given pixel, the device receives the intended color, (r, g, b), as defined in the target color space, for example, sRGB. This is the intent of the content. If it has a gamma or tonal mapping applied to the data, then the data is linearized. If that content pixel happens to fall on a grid point, the correction matrix for that grid point is applied to (r, g, b) to form the new set of color values. If the content pixel is not on a grid point, then a correction matrix is formed by interpolating each element of the correction matrix using the matrices at nearby grid points. A new set of color values is then formed using the correction matrix. A gamma can be applied to the new color values, if the device expects it. The new set of color values are then sent to the device for displaying the image.

An example of forming a correction matrix can be described as follows. First, a full screen of red on the device (1, 0, 0) for every pixel is shown on the device. The xyY values (chromaticity and luminance) for each part of the resulting image are determined. This data gathering is repeated for the green and blue channels. The resolution of the image should be at least as high as the desired final grid resolution (e.g., 81×61). A spectroradiometer can be used to determine the xyY values. Alternatively, a color camera can be used, its sensor calibrated so that xyY values can be computed from the sensor's RGB output.

If a lower resolution for the grid of matrices is used than the xyY images obtained above, then tile rectangles, or tile regions, can be formed that tessellate over the entire image, each one centered on a grid point (e.g., 81×61 points that span the display evenly from corner to corner). The values for each channel are averaged over each tile rectangle, where the averaging is carried out in XYZ space (converted from camera r, g, b data). The XYZ data is subsequently converted to xyY data. Thus, for each channel, the result will be three sets of 81×61 points, each corresponding to x, y, and Y.

For each grid point, a matrix can be formed that converts the display's RGB at that location to XYZ. A fixed sRGB to XYZ matrix can be computed (which is independent of the device), and that matrix is multiplied onto the inverse of the display's RGB-to-XYZ matrix for that grid point, to form a sRGB-to-display-RGB matrix. This is the correction matrix what will convert the intended sRGB values (for a pixel at a certain location) into values that, when sent to the display, will actually result in the originally-intended color.

To calibrate a device, the following process can be carried out. First, for a given pixel, the intended color as defined in the target space, (r, g, b), is received. This is the intent of the content. The data can be linearized, if it has a gamma or tonal mapping applied. The color computations described here use numbers in linear space. If that content pixel happens to fall on a grid point, use the correction matrix for that grid point on (r, g, b) to get a new set of color values. If it is not on a grid point, each element of the correction matrix can be determined by interpolation of the matrices at nearby grid points. The selection of nearby grid points will depend on the interpolation method, like bilinear, barycentric, etc. This interpolated correction matrix is used for the pixel that is not a grid point. The interpolation is carried out for each element of the matrix, and the final matrix is used to modify the color. Next, a gamma can be applied to the new color values, if the device expects it. At this point, the new set of color values can be sent to the device.

In some embodiments, the calibration method can include additional processes to make the output more uniform in intensity. The method described above corrects the color to match the primaries for the target as well as the intended white point at a grid point. As a result, all other colors for that grid point will scale in relation to that white point. Additionally, to make the field uniform in intensity, the matrix can be scaled down at any grid point by a certain ratio. This ratio would be between the expected value (by calculating, using the xyY data and the calibration matrices calculated from that) and the intended intensity. For example, the matrix is scaled down if it produces values for (1, 1, 1) sRGB input that exceed the desired uniformity level. For example, if the expected value at a point is (0.8, 0.8, 0.8) for an input of (1, 1, 1) after calibration, and the brightness is set to just 0.4 of the peak level, the matrix can be scaled down for that point by a factor of 2, so the final output value would be (0.4, 0.4, 0.4).

In some embodiments, the calibration can be carried out for multiple depth planes of the wearable device and for different sides. For example, in a uniformity calibration, these processes can be carried out separately for each of four virtual images (e.g., left near, left far, right near, right far), and then the XYZ information of each depth plane and side can be used to balance those images to be as close as possible to the same color (chromaticity) and brightness (luminance).

Figure 6:
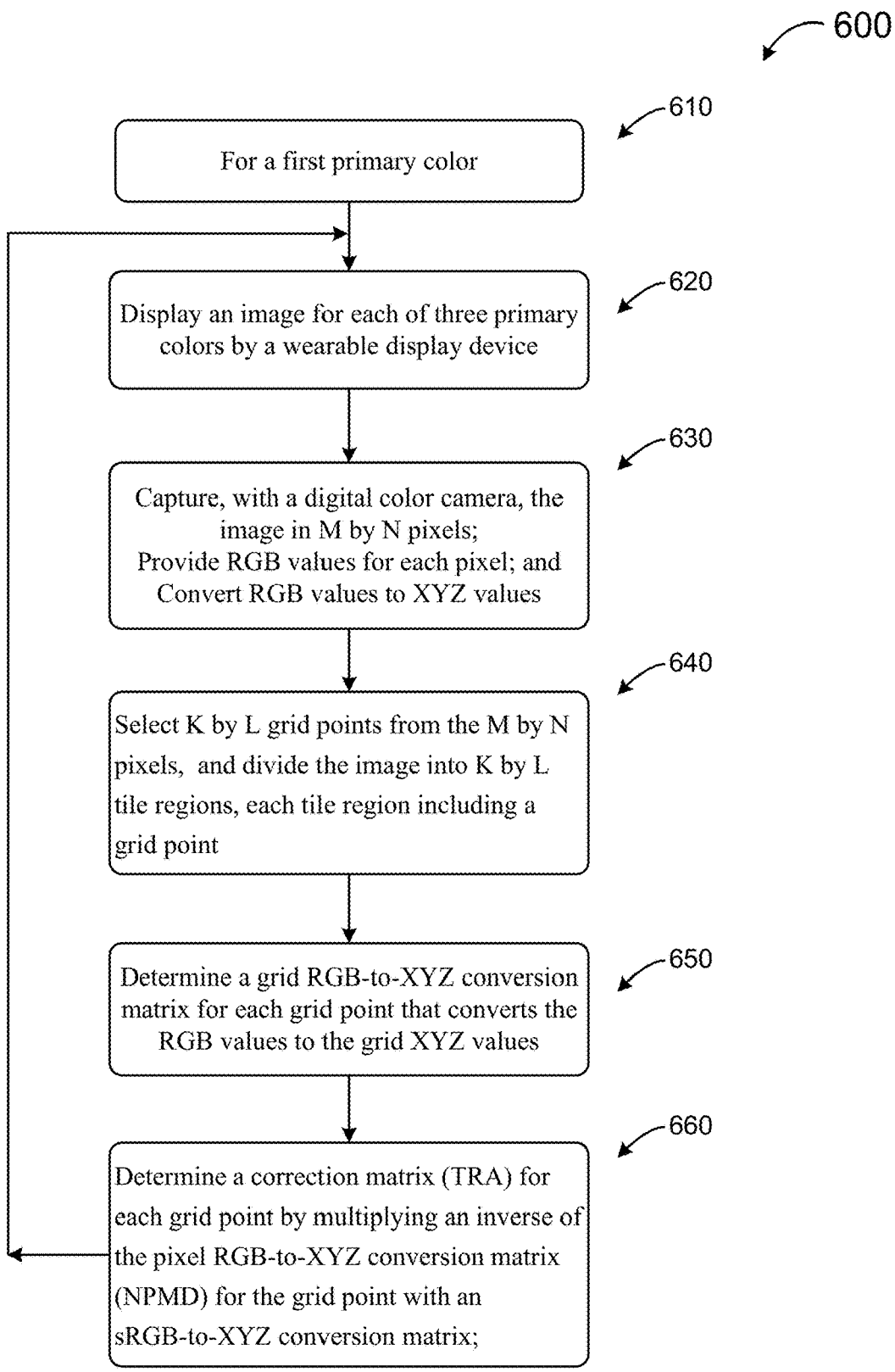
FIG. 6 is a flowchart illustrating a method for performing color calibration of a wearable device according to some embodiments of the present invention.

FIG. 6 is a simplified flowchart illustrating a method for performing color calibration of a wearable device according to some embodiments of the present invention. As shown in FIG. 6, a method 600 for calibrating a wearable device includes, displaying an image for each of three primary colors by a wearable display device, at 610 and 620. The method also includes capturing the image in M by N pixels using a digital color camera, where M and N are integers. The digital color camera provides RGB values for each of the pixels. The method further includes converting the RGB values for each of the pixels of the image to XYZ values using a camera conversion matrix that converts RGB values to corresponding XYZ values, at 630.

The method further includes, at 640, selecting K by L grid points from the M by N pixels, where K and L are integers smaller than M and N, and dividing the image into K by L tile regions, each tile region including a grid point. For each grid point, grid XYZ values are determined, based on averaging XYZ values of all pixels in a corresponding tile region. At 650, a grid RGB-to-XYZ conversion matrix is determined for each grid point that converts the RGB values at the grid point to the grid XYZ values of the grid point. At 660, a sRGB-to-display-RGB correction matrix is determined for each grid point by multiplying an inverse of the pixel RGB-to-XYZ conversion matrix (NPM$_D$) for the grid point with an sRGB-to-XYZ conversion matrix.

In some embodiments, the method is carried out for each of the primary colors red, green, and blue for one or more depth planes of a wearable device. Some of these steps are described in more detail below.

At 610 and 620, an image is displayed for each of three primary colors by the wearable display device. In order to convert the display device's native RGB primaries to sRGB, a 3×3 matrix is used for the CIE color metric method of transforming colors from the native primaries to XYZ. To specify the white point, a matrix is formed to transform from XYZ to sRGB primaries with a given white point. Given red, green, and blue full images, different areas in the displayed image are examined to identify the native color of that pixel point of the display.

Figure 7A:
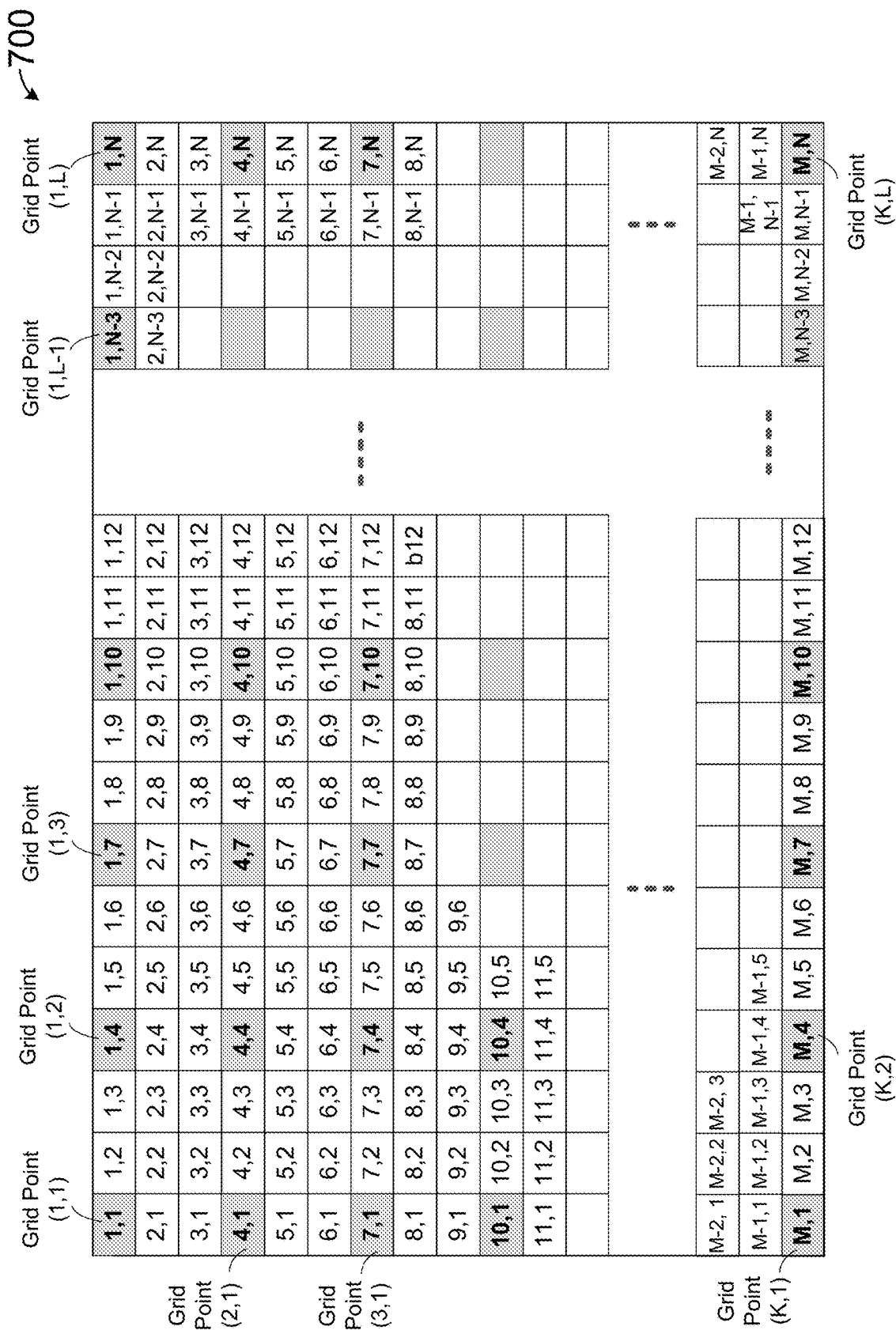
FIG. 7A is a simplified diagram illustrating the pixels in a display image field according to some embodiments of the invention.
Figure 7B:
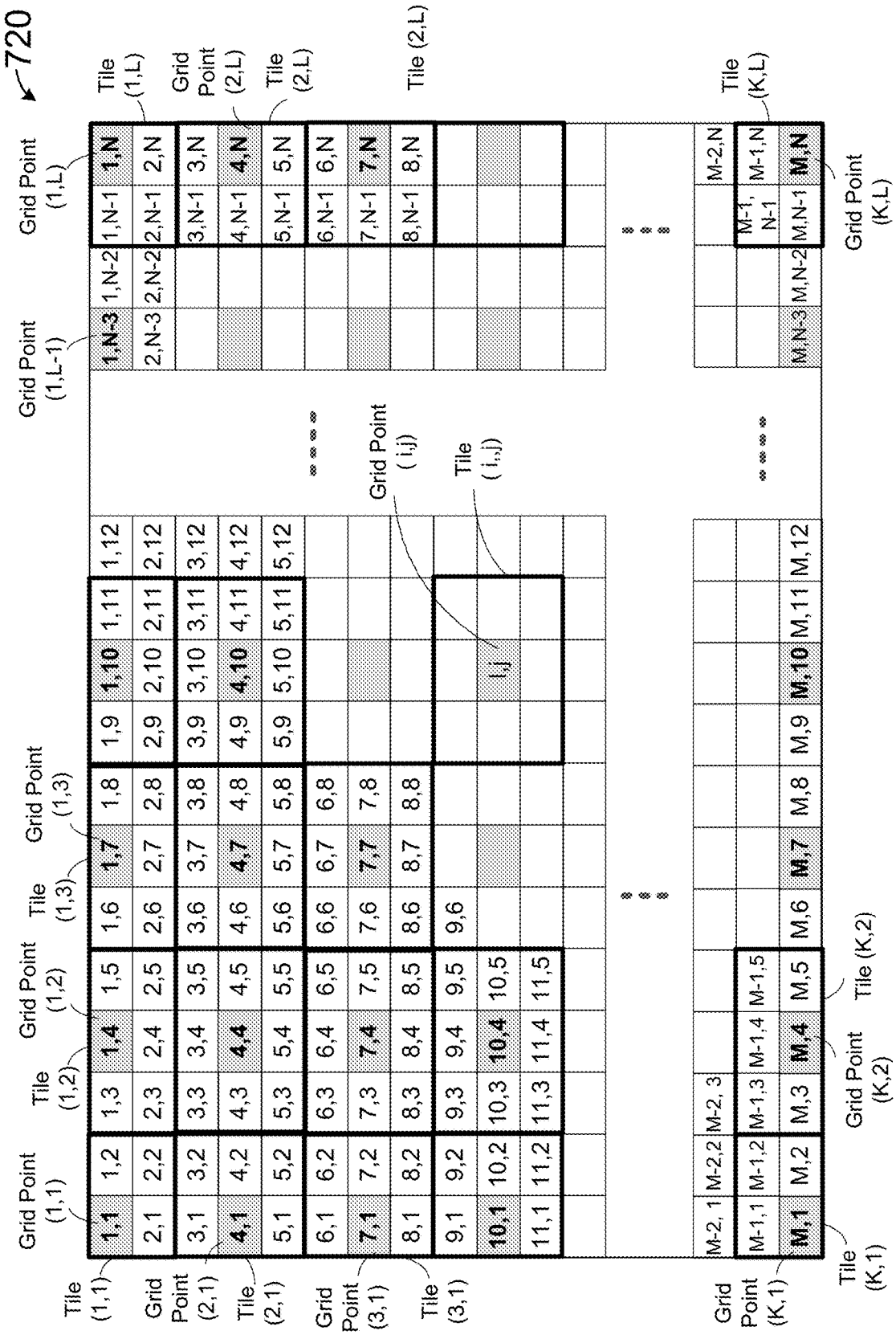
FIG. 7B is simplified diagram illustrating tiled regions in a display image field according to some embodiments of the invention.

At 640 in method 600, K by L grid points are selected from the M by N pixels, where K and L are integers smaller than M and N. The image field is divided into K by L tile regions, each tile region including a grid point. FIGS. 7A and 7B illustrate the selection of grid points and formation of the tile regions.

FIG. 7A is a simplified diagram illustrating the pixels in a display image field according to some embodiments of the invention. As shown in FIG. 7A, image field 700 includes enumerated pixels. In the example of FIG. 7A, there are (M+1)×(N+1) pixels arranged in M+1 rows and N+1 columns, each pixel labeled from (1, 1) to (M, N). For example, the first row includes pixels (1, 1), (1, 2), (1, 3), ..., (1, N−3), (1, N−2), (1, N−1), and (1, N), and the first column includes pixels (1, 1), (2, 1), (3, 1), ..., (M−2, 1), (M−1, 1), and (M, 1).

In order to perform pixel-by-pixel correction of the display, a conversion matrix needs to be determined for each pixel. However, such a task would require extensive computing power, hardware and software resource, and is time-consuming. Therefore, in some embodiments of the invention, the correction matrix is computed for a subset of all the pixels. For example, a group of grid points can be selected for computing the correction matrices. FIG. 7A also illustrates an example to grid points selection in the pixels of a display image field. FIG. 7A shows K×L grid points in shaded pixels, where K and L are integers less than M and N. For example, grid point (1, 1) is pixel (1, 1), grid point (1, 2) is pixel (1, 4), grid point (1, 3) is pixel (1, 7), ..., grid point (1, L−1) is pixel (1, N−3), and grid point (1, L) is pixel (1, N), etc. Similarly, grid point (2, 1) is pixel (4, 1), grid point (3, 1) is pixel (7, 1), ..., and grid point (K, 1) is pixel (M, 1). Further, in this example, grid point (K, L) is pixel (M, N).

FIG. 7B is simplified diagram illustrating tiled regions in a display image field according to some embodiments of the invention. As shown in FIG. 7B, the image display field is divided into tiled regions, each with multiple pixels associated with a grid point. The following tile regions are shown in FIG. 7B, Tile (1, 1), Tile (1, 2), Tile (1, 3), Tile (2, 1), Tile (3, 1), Tile (K, 1), Tile (K, 2), and Tile (i, j) associated with grid point (i, j), etc.

Continuing with method 600, at 650, a grid RGB-to-XYZ conversion matrix is determined for each grid point that converts the RGB values at the grid point to the grid XYZ values of the grid point. In some embodiments, the average XYZ is used as the XYZ for the grid point. A matrix is determined to convert the measured RGB of the gird point to the average XYZ of the corresponding tile region.

At 660, a (sRGB-to-display-RGB) correction matrix is determined for each grid point by multiplying an inverse of the pixel RGB-to-XYZ conversion matrix (NPM$_D$) for the grid point with an sRGB-to-XYZ conversion matrix.

Figure 7C:
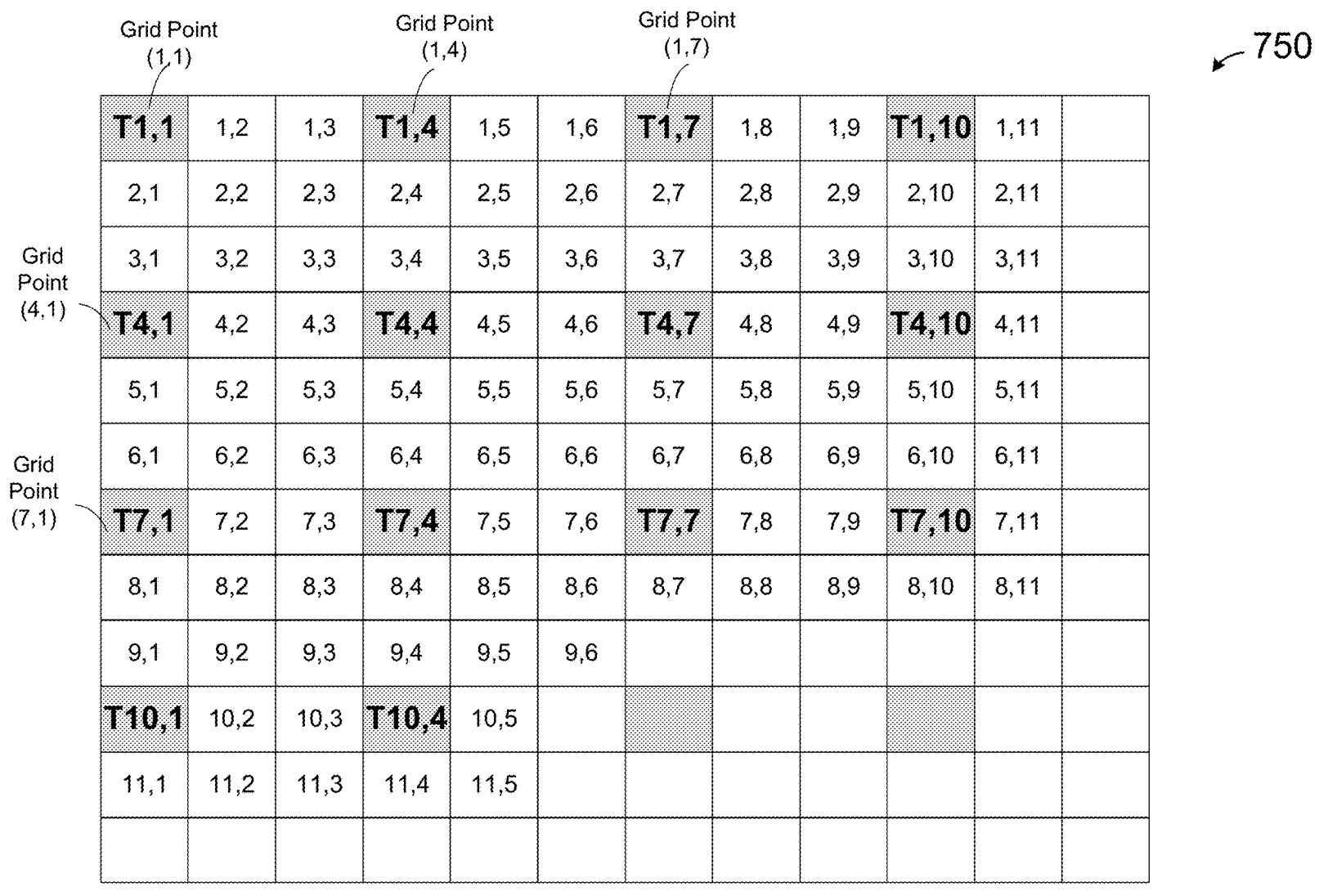

FIG. 7C is a simplified diagram illustrating a portion of a display image field according to some embodiments of the invention. FIG. 7C shows a correction matrix for each grid point, here the grid point is identified by the pixel location where it resides, for example, T(i, j) represents the correction matrix for pixel (i, j), which has been selected as a grid point. The correction matrices for the grid points form a basis for calibrating the display device, as described below.

Figure 8:
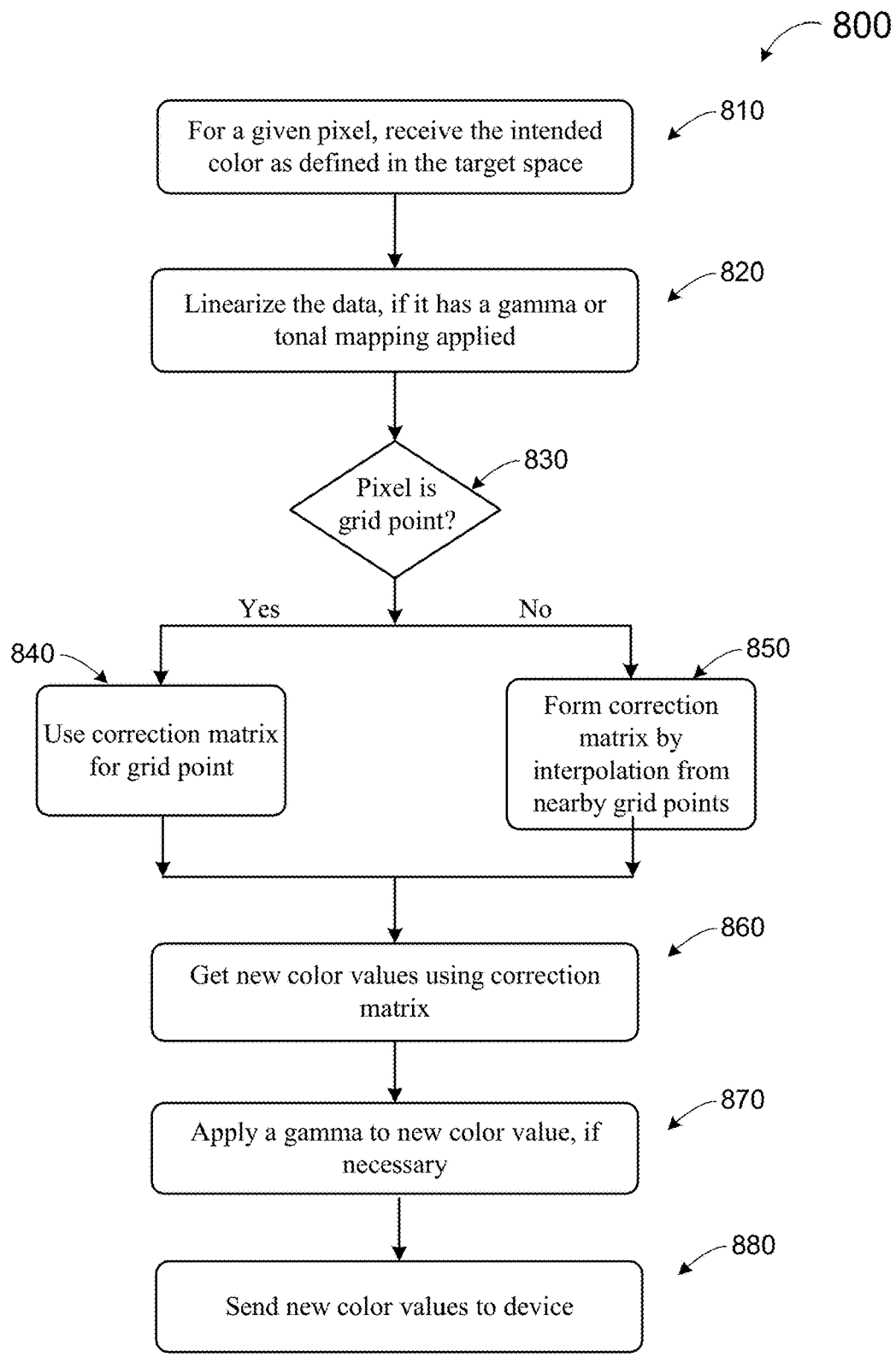
FIG. 8 is a flowchart illustrating a method of calibrating a display device according to some embodiments of the present invention.

FIG. 8 is a flowchart illustrating a method of calibrating a display device according to some embodiments of the present invention. As shown in FIG. 8, the method 800 of calibrating a display device includes, at 810, receiving color values for a pixel for an intended content as defined in a target color space. At 820, the data is linearized, if a gamma or tonal mapping has been applied. At 830, it is determined if the pixel is a grid point. If the pixel is a grid point, at 840, the correction matrix for the grid point as determined above is applied to the received color values to generate corrected color values. If the pixel is not a grid point, at 850, a pixel correction matrix is determined for the pixel point by interpolation from correction matrices at adjacent grid points. Here, each matrix element of the correction matrix is interpolated from a corresponding matrix element in the correction matrices at adjacent grid points. At 860, the pixel correction matrix for the pixel is applied to the received color values to generate new color values. At 870, a gamma is applied to the new color values, if necessary. At 880, the new color values are sent to the device for displaying the intended content. Some of these steps are described in more detail below.

At 810 of method 800, color values are received for a pixel for an intended content as defined in a target color space. For example, the color values for a pixel from a content provider may be specified in an absolute color space, for example, sRGB color space. For example, in the sRGB color space, a white color is specified as (1 1 1), and a red color is specified as (1 0 0), etc.

At 840, if the pixel is a grid point, the correction matrix for the grid point as determined above is applied to the received color values to generate corrected color values. With the correction matrix TRA determined for each grid point, the sRGB content values $[R_S\ G_S\ B_S]$ can be converted into a modified RGB content values $[R_D\ G_D\ B_D]$ to be used by the device to display the correct image. This conversion can be carried out as follows.

$$\begin{bmatrix} R_D \\ G_D \\ B_D \end{bmatrix} = TRA \times \begin{bmatrix} R_S \\ G_S \\ B_S \end{bmatrix}$$

At 850, if the pixel is not a grid point, a pixel correction matrix is determined for the pixel point by interpolation from correction matrices at adjacent grid points. Here, each matrix element of the correction matrix is interpolated from the corresponding matrix element in the correction matrices at adjacent grid points. More details about the interpolation process is described below with reference to FIG. 9.

Figure 9:
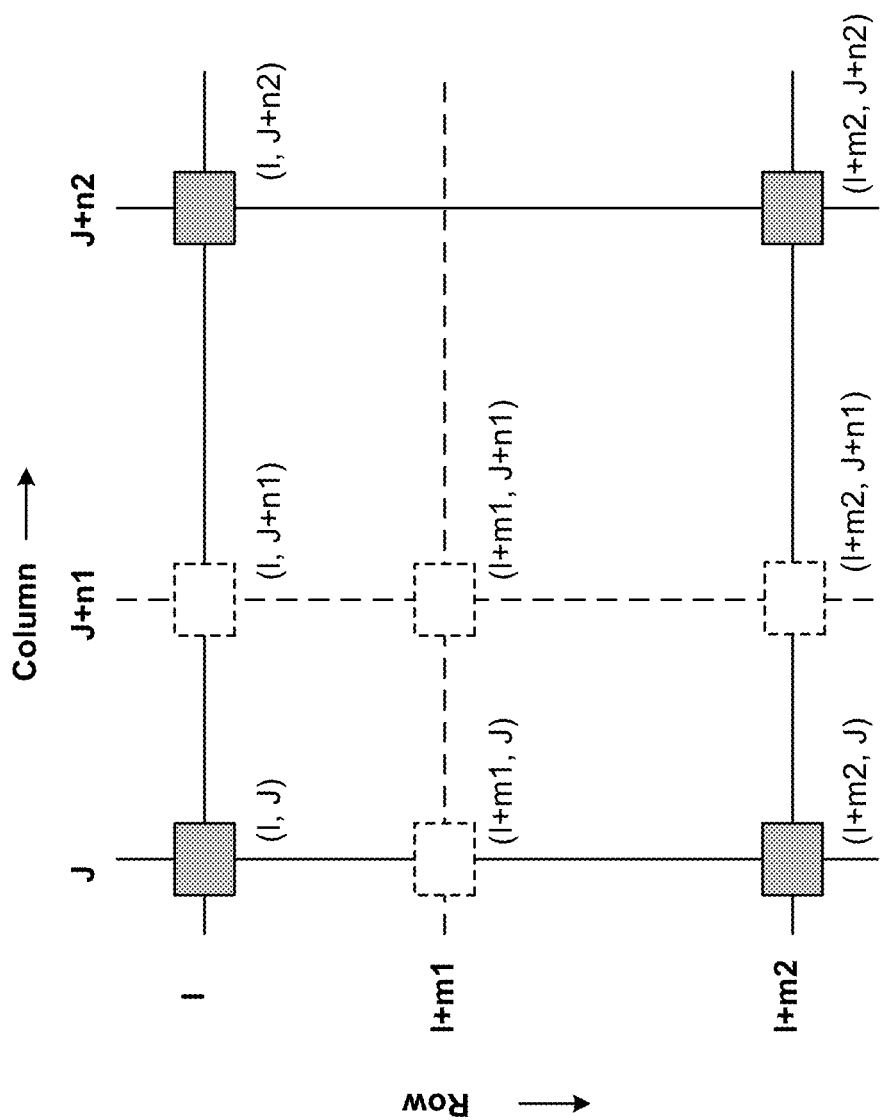
FIG. 9 is a simplified diagram illustrating interpolation of the correction matrix for pixel points that are not grid points according to some embodiments of the present invention.

FIG. 9 is a simplified diagram illustrating interpolation of the correction matrix for pixel points that are not grid points according to some embodiments of the present invention. FIG. 7 shows a portion of a display array spanning from rows I to I+m2 and from columns J to J+n2. Four pixels, with row and column designations (I, J), (I, J+n2), (I+m2, J), and (I+m2, J+n2), are grid points used for characterization as described above in connection to FIGS. 7A-7C. As described above, each of the grid point pixels have a corresponding correction matrix T, or TRA, $$T = TRA = \begin{bmatrix} t_{rr} & t_{rg} & t_{rb} \\ t_{gr} & t_{gg} & t_{gb} \\ t_{br} & t_{bg} & t_{bb} \end{bmatrix}$$

For example, pixel (I, J) has a correction matrix T(I, J), pixel (I, J+n2) has a correction matrix T(I, J+n2), pixel (I+m2, J) has a correction matrix T(I+m2, J), and pixel (I+m2, J+n2) has a correction matrix T(I+m2, J+n2).

In order to perform pixel-by-pixel correction, a correction matrix needs to be determined for each pixel that is not a grid point. For example, in FIG. 9, pixels (I, J+n1), (I+m1, J), (I+m1, J+m1), (I+m2, J+m1) are not grid points. In embodiments of the invention, the matrices for these pixels can be derived using an interpolation method to determine each element of the transformation matrix based on values at nearby grid points. Interpolation methods such as bilinear, barycentric, etc., or other methods can be used. A processing using the bilinear method is described below.

Let t(I, J) represent an element of the correction matrix T(I, J) for grid point pixel (I, J), where t(I, J) represents any of the matrix element Trr, Trg, Trb, Tgr, . . . , etc., of correction matrix T(I, J). Using the bilinear method, t(I, J+n1) for non-grid point pixel (I, J+n1) can be interpolated from the corresponding values t(I, J) at grid point pixel (I, J) and t(I, J+n2) at grid point pixel (I, J+n2). For example, the matrix element t(I, J+n1) for non-grid point pixel (I, J+n1) can be expressed as follows.

$$t(I, J+n1) = \frac{(J+n1)-J}{(J+n2)-J} \times t(I, J) + \frac{(J+n2)-(J+n1)}{(J+n2)-J} \times t(I, J+n2)$$

The above equation can be simplified to the following, $$t(I, J+n1) = \frac{n1}{n2} \times t(I, J) + \frac{n2-n1}{n2} \times t(I, J+n2)$$

All matrix elements of correction matrix T(I, J+n1) can be similarly determined, and the correction matrix T(I, J+n1) can be expressed as follows.

$$T(I, J+n1) = \frac{n1}{n2} \times T(I, J) + \frac{n2-n1}{n2} \times T(I, J+n2)$$

Similarly, the correction matrix T(I+m2, J+n1) can be determined using bilinear interpolation, and expressed as follows.

$$T(I+m2, J+n1) = \frac{n1}{n2} \times T(I+m2, J) + \frac{n2-n1}{n2} \times T(I+m2, J+n2)$$

Further, the correction matrix T(I+m1, J+n1) can be determined using bilinear interpolation, from four adjacent grid points, from T(I, J+n1) and T(I+m2, J+n1).

$$T(I+m1, J+n1) = \frac{m1}{m2} \times T(I, J+n1) + \frac{m2-m1}{m2} \times T(I+m2, J+n1)$$

Referring back to method 800 for calibrating a wearable device of FIG. 8, at 860, the pixel correction matrix for the pixel is applied to the received color values to generate new color values. In these embodiments, with the correction matrix TRA determined for each grid point, the sRGB content values [$R_S$ $G_S$ $B_S$] can be converted into a modified RGB content values [$R_D$ $G_D$ $B_D$] for the device to display the correct image. This conversion is carried out as follows.

$$\begin{bmatrix} R_D \\ G_D \\ B_D \end{bmatrix} = TRA \times \begin{bmatrix} R_S \\ G_S \\ B_S \end{bmatrix}$$

where $$TRA = \begin{bmatrix} t_{rr} & t_{rg} & t_{rb} \\ t_{gr} & t_{gg} & t_{gb} \\ t_{br} & t_{bg} & t_{bb} \end{bmatrix}$$

$$\begin{bmatrix} R_D \\ G_D \\ B_D \end{bmatrix} = \begin{bmatrix} t_{rr} & t_{rg} & t_{rb} \\ t_{gr} & t_{gg} & t_{gb} \\ t_{br} & t_{bg} & t_{bb} \end{bmatrix} \times \begin{bmatrix} R_S \\ G_S \\ B_S \end{bmatrix}$$

For pixel-by-pixel correction, a correction matrix is determined for each pixel. For example, the sRGB content values [$R_S$ $G_S$ $B_S$] may be [1 0 0] for a red color. In the correction process, the sRGB content values [$R_S$ $G_S$ $B_S$] may be converted into new color values, or modified RGB content values [$R_D$ $G_D$ $B_D$], for example, [0.9, 0.2, 0.3], for the device to display the correct image.

Figure 10:
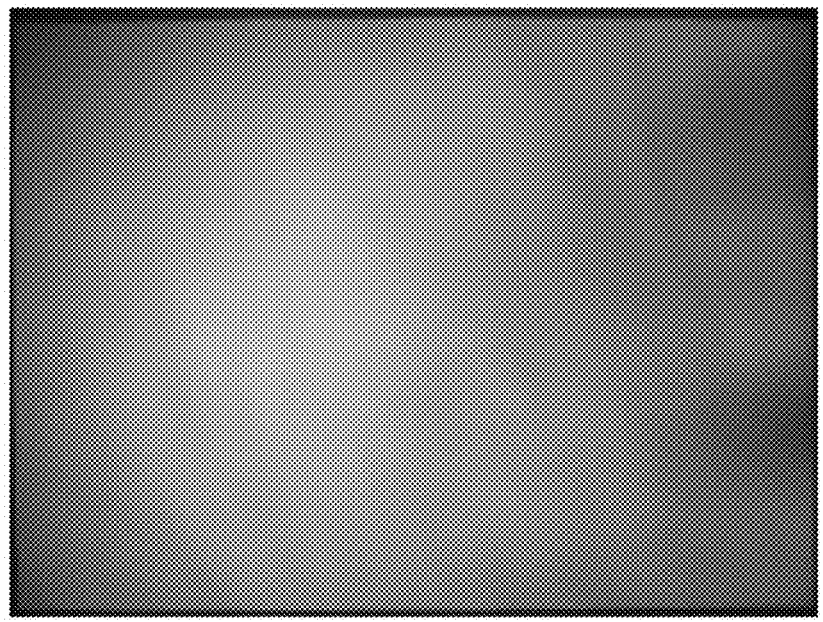
FIGS. 10 and 11 are diagrams illustrating an example of calibration results using methods described above according to some embodiments of the invention.
Figure 11:
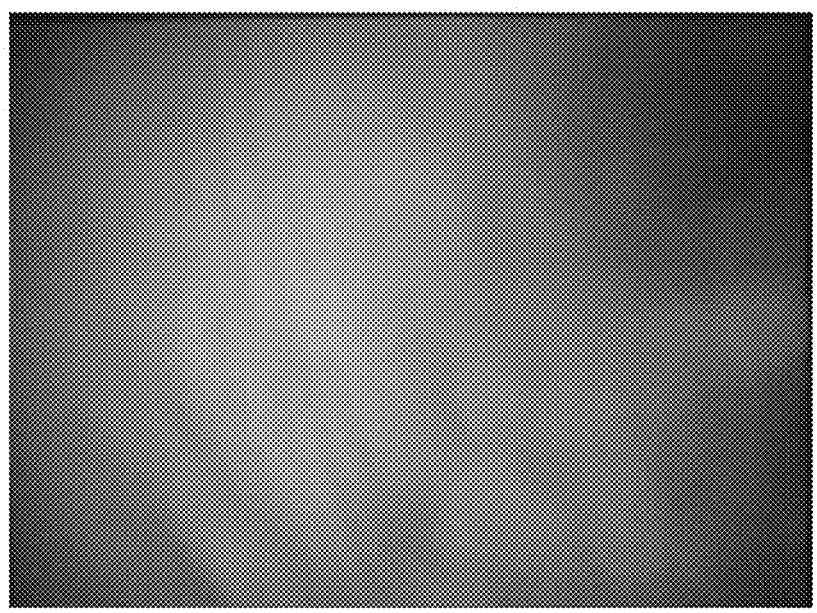

FIGS. 10 and 11 are diagrams illustrating an example of calibration results using methods described above according to some embodiments of the invention. FIG. 10 shows an emulated output of a white color over an image from a wearable display device without calibration. It can be seen that shades of red, green, and blue are present in different regions of the image. FIG. 11 shows an example of emulated output of a white color over after calibration using methods descried above. It can be seen that the color is corrected to match the primaries for the target as well as the intended white point. The variations in darkness is caused by non-uniformity in intensity, which can be addressed using calibration methods such as scaling down the intensity of pixel points outside a certain range.

In the embodiments described above, the image light generated by the wearable display device may include light in the three primary colors, namely blue (B), green (G), and red (R). The wearable display device can also have a "primary" color that is a mixture of the display system's native (most saturated) source colors. For example, it may be desirable to mix a small amount of green to red to create a less saturated red primary color in the display. This can be accomplished by turning on a green LED during the red LED's field sequential period. This can also be accomplished by adding an extra green luminance to the green field sequential color period, by utilizing higher LCOS gray levels, or by increasing the LED optical power during the green period. This "mixture primary" can also have a color that is close to white (approximately equal amounts of red, green, blue). In these cases, the camera can be calibrated in the same manner as described above, by determining a conversion model from camera RGB to absolute XYZ for the "mixture primary".

Figure 12:
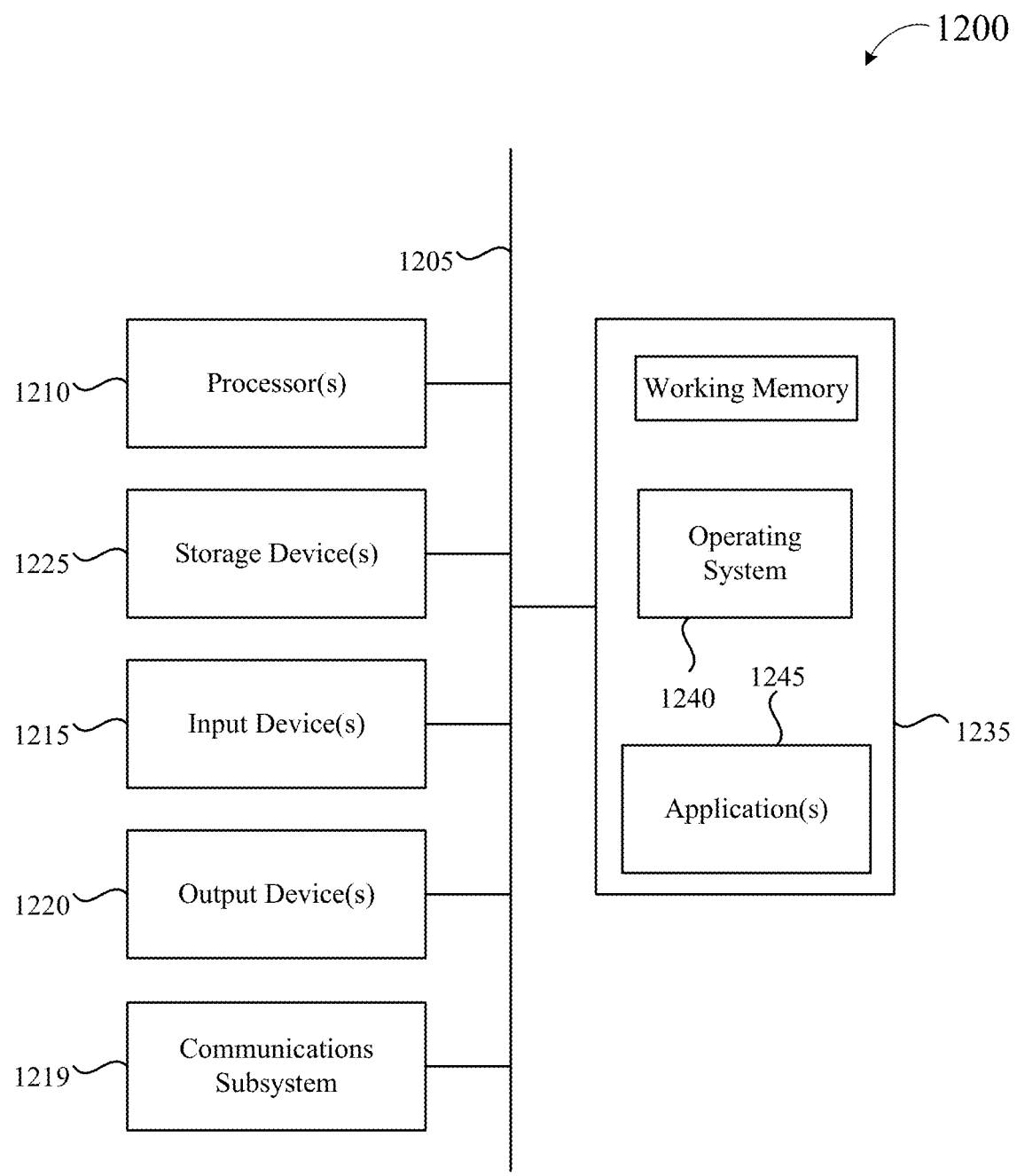
FIG. 12 is a simplified schematic diagram illustrating a computer system according to an embodiment described herein.

FIG. 12 is a simplified schematic diagram illustrating a computer system 1200 according to an embodiment described herein. Computer system 1200 as illustrated in FIG. 12 may be incorporated into devices such as wearable display device 100 as described herein. FIG. 12 provides a schematic illustration of one embodiment of computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

Computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include without limitation a mouse, a keyboard, a camera, and/or the like; and one or more output devices 1220, which can include without limitation a display device, a printer, and/or the like.

Computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1200 might also include a communications subsystem 1219, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1219 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1219. In other embodiments, a portable electronic device, e.g. the first electronic device, may be incorporated into computer system 1200, e.g., an electronic device as an input device 1215. In some embodiments, computer system 1200 will further comprise a working memory 1235, which can include a RAM or ROM device, as described above.

Computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1200 and/or might take the form of source and/or installable code, which, upon compilation and/or installation on computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1200 to perform methods in accordance with various embodiments of the technology. According to a set of embodiments, some or all of the procedures of such methods are performed by computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM (compact disc read only memory), any other optical medium, punchcards, papertape, any other physical medium with patterns of holes, a RAM, a PROM, EPROM (erasable programmable read-only memory), a FLASH-EPROM (Flash erasable programmable read-only memory), any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1200.

The communications subsystem 1219 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

What is claimed is:

1. A method for calibrating a wearable device, the method comprising:
    displaying an image with a plurality of pixels for each of three primary colors using the wearable device;
    determining RGB and XYZ values for each of the plurality of pixels;
    selecting a subset of the plurality of pixels to form a group of grid points;
    dividing the image into a group of tile regions, each tile region including a grid point;
    determining grid XYZ values for each grid point, based on averaging XYZ values of all pixels in a corresponding tile region;
    determining a grid RGB-to-XYZ conversion matrix for each grid point; and
    determining a correction matrix for the plurality of pixels by:
        for each pixel that is a grid point, multiplying an inverse of the grid RGB-to-XYZ conversion matrix for the grid point with an sRGB-to-XYZ conversion matrix to form grid point correction matrix elements; and
        for each pixel that is not a grid point, forming pixel correction matrix elements by interpolating using the grid point correction matrix elements from adjacent grid points.

2. The method of claim 1 wherein, for each tile region, a corresponding grid point is positioned in a corner of each tile region.

3. The method of claim 1, wherein the interpolation is performed using bilinear interpolation or barycentric interpolation.

4. The method of claim 1, further comprising:
    receiving color values for each pixel for an intended content as defined in a target color space;
    applying the correction matrix for each pixel to received color values to generate corrected color values; and
    sending the corrected color values to the wearable device for displaying the intended content.

5. The method of claim 4, further comprising linearizing received color values.

6. The method of claim 4, further comprising applying a gamma to corrected color values.

7. The method of claim 4, further comprising scaling down corrected color values.

8. The method of claim 1 further comprising:
    receiving color values for each pixel for an intended content as defined in a target color space;
    applying the correction matrix for each grid point to received color values to generate new color values for the grid point;
    generating new color values for each pixel that is not a grid point by interpolating from the new color values for adjacent grid points; and
    sending the new color values to the wearable device for displaying the intended content.

9. The method of claim 1, wherein determining RGB and XYZ values for each of the plurality of pixels comprises capturing RGB values using a digital camera and converting the RGB values to XYZ values.

10. The method of claim 1, wherein the correction matrix is an sRGB-to-display-RGB correction matrix that is configured to provide corrected display-RGB color values to the wearable device.

11. A method for calibrating a wearable device, comprising:
    displaying an image for each of three primary colors by a wearable display device;
    capturing the image in M by N pixels using a digital color camera, where M and N are integers, the digital color camera providing RGB values for each pixel;
    converting the RGB values for each of the pixels of the image to XYZ values using a camera conversion matrix that converts RGB values to corresponding XYZ values;
    selecting K by L grid points from the M by N pixels, where K and L are integers smaller than M and N;
    dividing the image into K by L tile regions, each tile region including a grid point;
    determining grid XYZ values for each grid point, based on averaging XYZ values of all pixels in a corresponding tile region;
    determining a grid RGB-to-XYZ conversion matrix for each grid point that converts the RGB values at the grid point to the XYZ values of the grid point;
    determining a correction matrix for each pixel by:
        for each pixel that is a grid point, multiplying an inverse of the grid RGB-to-XYZ conversion matrix for the grid point with an sRGB-to-XYZ conversion matrix to form grid point correction matrix elements; and
        for each pixel that is not a grid point, forming pixel correction matrix elements by interpolating from grid point correction matrix elements from adjacent grid points;
        wherein the correction matrix is an sRGB-to-display-RGB correction matrix that is configured to provide corrected display-RGB color values to the wearable device,
    receiving color values for a pixel for an intended content as defined in a target color space;
    applying the correction matrix for each pixel to received color values to generate new color values; and
    sending the new color values to in the wearable device for displaying the intended content.

12. The method of claim 11, wherein, for each tile region, a corresponding grid point is positioned in a corner of each tile region.

13. The method of claim 12, wherein the interpolation is performed using bilinear interpolation or barycentric interpolation.

14. The method of claim 12, further comprising linearizing received color values.

15. The method of claim 12, further comprising applying a gamma to the new color values.

16. The method of claim 12, further comprising scaling down the new color values.

17. A system for calibrating a wearable display device, the system comprising:
- a digital color camera disposed to capture an image displayed by the wearable display device, the digital color camera configured to provide RGB values for each of a plurality of pixels of the image;
- a first processor, configured for:
  - converting the RGB values provided by the digital color camera to XYZ values;
  - selecting a subset of the plurality of pixels to form a group of grid points;
  - dividing the image into a group of tile regions, each tile region including a grid point;
  - determining grid XYZ values for each grid point, based on averaging XYZ values of all pixels in a corresponding tile region;
  - determining a grid RGB-to-XYZ conversion matrix for each grid point; and
  - determining a correction matrix for the plurality of pixels by:
    - for each pixel that is a grid point multiplying an inverse of the grid RGB-to-XYZ conversion matrix for the pixel with an sRGB-to-XYZ conversion matrix to form grid point correction matrix elements; and
    - for each pixel that is not a grid point, forming pixel correction matrix elements by interpolating using the grid point correction matrix elements from adjacent grid points.

18. The system of claim 17, wherein the correction matrix is an sRGB-to-display-RGB correction matrix that is configured to provide corrected display-RGB color values to the wearable display device.

19. The system of claim 17, wherein the system is further configured for:
- receiving color values for a pixel for an intended content as defined in a target color space;
- applying the correction matrix to received color values to generate new color values; and
- sending the new color values to the wearable display device for displaying the intended content.

20. A method for calibrating a wearable device, the method comprising:
- displaying an image with a plurality of pixels for each of three primary colors using the wearable device;
- determining RGB and XYZ values for each of the plurality of pixels;
- determining a pixel RGB-to-XYZ conversion matrix for each pixel;
- determining a correction matrix for each pixel by:
  - for each pixel that is a grid point, multiplying an inverse of the pixel RGB-to-XYZ conversion matrix for the grid point with an sRGB-to-XYZ conversion matrix to form grid point correction matrix elements; and
  - for each pixel that is not a grid point, forming pixel correction matrix elements by interpolating from grid point correction matrix elements from adjacent grid points;
- receiving color values for each pixel for an intended content as defined in a target color space;
- applying the correction matrix for each pixel to received color values to generate corrected color values; and
- sending the corrected color values to the wearable device for displaying the intended content.

* * * * *